US007641951B2

(12) United States Patent
Hodsdon et al.

(10) Patent No.: US 7,641,951 B2
(45) Date of Patent: Jan. 5, 2010

(54) PRINTING STOCK FOR USE IN PRINTING COMPOSITE SIGNS, METHODS AND APPARATUS FOR PRINTING SUCH SIGNS, AND METHODS FOR MANUFACTURING SUCH PRINTING STOCK

(75) Inventors: Jerry G. Hodsdon, Forestdale, MA (US); Thomas M. Wien, Newport Beach, CA (US); Donald E. Banks, Huntington Beach, CA (US); Douglas W. Wilson, San Dimas, CA (US); Ronald Ugolick, San Dimas, CA (US); Michael R. Hamel, Brea, CA (US)

(73) Assignee: Avery Dennison Corporation, Pasadena, CA (US)

( * ) Notice: Subject to any disclaimer, the term of this patent is extended or adjusted under 35 U.S.C. 154(b) by 810 days.

(21) Appl. No.: 10/836,604

(22) Filed: May 1, 2004

(65) Prior Publication Data

US 2005/0244603 A1 Nov. 3, 2005

(51) Int. Cl.
*B32B 33/00* (2006.01)
*B65D 65/28* (2006.01)
*G06T 1/00* (2006.01)

(52) U.S. Cl. .................... 428/40.1; 428/42.1; 428/42.2; 428/42.3; 428/43; 428/192; 345/501

(58) Field of Classification Search ................. 345/501; 428/42.1, 42.2, 42.3, 43, 192, 194
See application file for complete search history.

(56) References Cited

U.S. PATENT DOCUMENTS 0,428,086 A 5/1890 Galle (Continued)

FOREIGN PATENT DOCUMENTS

CA 2285775 10/1999

(Continued)

OTHER PUBLICATIONS

Print-N-Peel™ Poster Paper [online]. [retrieved on Nov. 6, 2003]. Retrieved from Internet: <: http://www.print-n-peel.com/PNP/bro1.html>.

(Continued)

*Primary Examiner*—Patricia L Nordmeyer
(74) *Attorney, Agent, or Firm*—Patent Group Law Department Avery Dennison Corporation

(57) ABSTRACT

Printing stock for use in making a sign that includes a face sheet and a backing sheet. The sign is formed, for example, by overlapping a plurality of face sub-sheets of the printing stock, with the face sub-sheets arranged in a pattern to form a desired image of the sign. The face sheet includes a printing surface for receiving ink and an adhesive surface for receiving the backing sheet. The face sheet includes a face cut forming a margin and the face sub-sheet such that at least a portion of the margin is separable from the face sub-sheet. The backing sheet may include a backing cut forming a border and a backing sub-sheet such that at least a portion of the border is separable from the backing sub-sheet so that at least a portion of the adhesive surface of the face sheet is exposable.

5 Claims, 25 Drawing Sheets

U.S. PATENT DOCUMENTS

| | | | | |
|---|---|---|---|---|
| 746,794 | A | 12/1903 | Coulet et al. | |
| 3,185,197 | A | 5/1965 | Spiro et al. | |
| 3,565,462 | A | 2/1971 | Gottlieb | |
| 3,571,999 | A | 3/1971 | Downing | |
| 3,661,664 | A | 5/1972 | Lundell | |
| 3,775,885 | A | 12/1973 | Shepherd | |
| 3,950,580 | A | 4/1976 | Boudet | |
| 4,103,445 | A | 8/1978 | Smith et al. | |
| 4,237,185 | A | 12/1980 | Lombardi et al. | |
| 4,244,769 | A | 1/1981 | Tracy | |
| 4,339,886 | A | 7/1982 | Griffiths et al. | |
| 4,400,419 | A | 8/1983 | Laczynski | |
| 4,421,807 | A | 12/1983 | Clausing et al. | |
| 4,660,310 | A | 4/1987 | Farmer | |
| 4,748,758 | A | 6/1988 | Gaston | |
| 4,765,654 | A | 8/1988 | Nakamura | |
| 4,771,560 | A | 9/1988 | Richards | |
| 4,794,712 | A | 1/1989 | Wood | |
| 4,853,752 | A | 8/1989 | Takahashi et al. | |
| 4,873,643 | A | 10/1989 | Powell | |
| 4,889,754 | A | 12/1989 | Vargas | |
| 4,897,943 | A | 2/1990 | Otake | |
| 4,897,944 | A | 2/1990 | Otake et al. | |
| 4,898,323 | A | 2/1990 | Chen et al. | |
| 4,900,597 | A | 2/1990 | Kurtin | |
| 4,946,039 | A | 8/1990 | Garran | |
| 4,958,237 | A | 9/1990 | Kubota | |
| 4,961,811 | A | 10/1990 | Haugwitz | |
| 4,995,641 | A | 2/1991 | Landry et al. | |
| 5,090,733 | A | 2/1992 | Bussiere | |
| 5,146,343 | A | 9/1992 | Fujii | |
| 5,200,242 | A | 4/1993 | Hohmann | |
| 5,278,400 | A | 1/1994 | Appel | |
| 5,293,705 | A | 3/1994 | Wood | |
| 5,313,725 | A | 5/1994 | DeVassie | |
| 5,318,825 | A | 6/1994 | Naber | |
| 5,323,552 | A | 6/1994 | Fritz | |
| 5,364,200 | A | 11/1994 | Russo et al. | |
| 5,389,414 | A | 2/1995 | Popat | |
| 5,445,417 | A | 8/1995 | Bromer et al. | |
| 5,492,476 | A | 2/1996 | Ball | |
| 5,509,694 | A | 4/1996 | Laurash et al. | |
| 5,515,900 | A | 5/1996 | West | |
| 5,530,793 | A | 6/1996 | Watkins | |
| 5,571,587 | A | 11/1996 | Bishop et al. | |
| 5,600,910 | A | 2/1997 | Blackburn | |
| 5,631,747 | A | 5/1997 | Farrell et al. | |
| 5,649,216 | A | 7/1997 | Sieber | |
| 5,666,471 | A | 9/1997 | Fujii | |
| 5,667,855 | A | 9/1997 | Borden et al. | |
| 5,702,789 | A | 12/1997 | Fernandez-Kirchberger | |
| 5,712,012 | A | 1/1998 | Forman et al. | |
| 5,727,816 | A | 3/1998 | Ong | |
| 5,730,826 | A | 3/1998 | Sieber et al. | |
| 5,789,050 | A | 8/1998 | Kang | |
| 5,792,297 | A | 8/1998 | Hunter et al. | |
| 5,825,996 | A | 10/1998 | Davis et al. | |
| 5,907,917 | A | 6/1999 | Bicker | |
| 5,911,522 | A | 6/1999 | Wood | |
| 5,944,018 | A | 8/1999 | Allgood | |
| 5,960,848 | A | 10/1999 | Schirer | |
| 5,972,155 | A | 10/1999 | Cooprider et al. | |
| 5,989,382 | A | 11/1999 | Parker | |
| 5,997,683 | A | 12/1999 | Popat | |
| 6,001,209 | A | 12/1999 | Popat et al. | |
| 6,004,421 | A | 12/1999 | Landa | |
| 6,017,408 | A | 1/2000 | Rogers et al. | |
| 6,021,593 | A | 2/2000 | Hite | |
| 6,079,172 | A | 6/2000 | Chenel | |
| 6,085,452 | A | 7/2000 | Davis | |
| 6,106,651 | A | 8/2000 | Sieber et al. | |
| 6,155,325 | A | 12/2000 | Schirer | |
| 6,170,183 | B1 | 1/2001 | Keefe | |
| 6,187,405 | B1 | 2/2001 | Rudin | |
| 6,227,964 | B1 | 5/2001 | Dawson et al. | |
| 6,237,668 | B1 | 5/2001 | Hitchings | |
| 6,256,109 | B1 | 7/2001 | Rosenbaum et al. | |
| 6,276,925 | B1 | 8/2001 | Varga | |
| 6,382,433 | B1 | 5/2002 | Podergois | |
| 6,436,501 | B1 | 8/2002 | Steadman | |
| 6,446,375 | B1 | 9/2002 | Davis | |
| 6,453,591 | B1 | 9/2002 | Siener | |
| 6,464,821 | B1 | 10/2002 | Phillips et al. | |
| 6,523,288 | B1 | 2/2003 | Sackett | |
| 6,549,298 | B1 | 4/2003 | Sieber et al. | |
| 6,560,847 | B2 | 5/2003 | Ohlsson | |
| 6,572,379 | B1 | 6/2003 | Sears et al. | |
| 6,577,845 | B2 | 6/2003 | Stevens | |
| 6,578,499 | B2 | 6/2003 | Kroll et al. | |
| 6,591,076 | B2 | 7/2003 | Connors | |
| 6,627,033 | B1 | 9/2003 | Dexter | |
| 6,722,068 | B2 | 4/2004 | Ohlsson | |
| 2003/0025920 | A1 | 2/2003 | Yamamoto | |
| 2003/0202211 | A1 | 10/2003 | Yudasaka et al. | |
| 2005/0066560 | A1 | 3/2005 | Ternovits et al. | |
| 2005/0089663 | A1 * | 4/2005 | Wong et al. ................ | 428/42.3 |

FOREIGN PATENT DOCUMENTS

| | | | |
|---|---|---|---|
| EP | 1 094 433 | A2 | 4/2001 |
| FR | 2656712 | | 7/1991 |
| GB | 2 329 060 | A | 3/1999 |
| GB | 2 354 870 | A | 4/2001 |
| WO | WO 03/053691 | A1 | 7/2003 |

OTHER PUBLICATIONS

Print-N-Peel™ Poster Paper Instructions, 1999, Practical Musings Inc., Santa Clara, CA.

Poster, Make Great banners, posters, signs and photo murals[online]. [retrieved on Nov. 10, 2003]. Retrieved from Internet: <http://www.postersw.com/poster.htm>.

International Search Report and Written Opinion dated Nov. 29, 2005 from corresponding International Application Nno. PCT/US2005/014856.

"Labels Films and Special Papers Add New Dimensions to Your Copier and Computer Printer", Datamark, Dec 1, 2002 pp. 1-12, XP000667383 p. 5. Copy of document not available. This item was cited in the International Search Report dated Nov. 29, 2005 from corresponding International Application No. PCT/US2005/014856.

Office Action dated Nov. 12, 2007 from corresponding European Application No. 05742357.6.

Response dated Mar. 17, 2008 from corresponding European Application No. 05742357.6.

Notice of Intent to Grant dated Jan. 29, 2009 from corresponding European Application No. 05742357.6.

International Preliminary Report on Patentability dated Nov. 29, 2006 from corresponding International Application No. PCT/US2005/014856.

* cited by examiner

PRINTING STOCK FOR USE IN PRINTING COMPOSITE SIGNS, METHODS AND APPARATUS FOR PRINTING SUCH SIGNS, AND METHODS FOR MANUFACTURING SUCH PRINTING STOCK

BACKGROUND OF THE INVENTION

The present invention relates printing stock for use in small-office, home-office (SOHO) or other printers. The present invention also relates to printing stock that includes adhesive, and to printing stock that is used to form signs or posters that, because of size, would not be able to be printed on a single sheet of printing stock.

Signs and posters are commonly utilized for any number of reasons, for example, for announcing a birthday, the arrival of a baby, an outdoor event at a park, a meeting, and so on. In many cases, the sign or poster is of a large size, that is, larger than a piece of paper having a standard size such as A4, 8½×11 inches, or legal size. Accordingly, a person desiring to make a large-scale sign has a couple of options. One option is to have the sign made professionally. However, this may involve a cost and a turn-around time that is not acceptable to a person.

Another option is to make the sign on a SOHO printer connected to a computer. To do so, a person needs to print out sections of the desired sign on a number of pieces of paper. Some SOHO printers cannot print over the entire extent of a sheet of paper (i.e., the edges of the paper are left blank), so a person may need to cut off the unprinted edges by hand and then assemble the remainder of the printed sheets together by abutting or overlapping them to form the sign. The assembled sheets then need to taped or otherwise adhered together. Available software can manipulate images so that partial images may be printed on a SOHO print, and then assembled by overlapping or abutting the individual sheets of stock.

One specific example of a conventional approach to printing large-scale signs on general-use printers is disclosed in U.S. Pat. No. 6,187,405 to Rudin. The Rudin patent shows two embodiments. One of the embodiments utilizes a sheet with a central image area defined by die cuts. The central image area is printed upon so the image edges align with the die cuts. The central image area is then removed from the sheet to form a sign.

In the other embodiment, a repositionable sheet has a strip of adhesive applied along a top edge and a bottom edge of the paper. The central image area is then printed upon and then removed from the sheet to form a sign. Without adhesive in a middle portion thereof, the central image area may be moved about when assembling a sign or a banner. However, in either embodiment of the Rudin patent, a user needs to position a plurality of sheets in such a way that adjacent edges of abutting sheets are precisely aligned in order to have whatever graphic or image is printed on the central image areas look presentable. Moreover, the Rudin patent discusses an extensive and time-consuming test-printing process whereby the user manually adjusts the print margins of the image so that the edges of the image precisely align with the die cuts around the central image area of the sheets.

While the above options may have cost advantages over professionally made signs, there are drawbacks. For example, a considerable amount of manual work needs to be employed to make the sign, particularly in ensuring that sheets are precisely printed and aligned, butting up against each other in a side-to-side arrangement. If there is any printer misregistration or skewing, then this cannot be compensated for, and the resulting images are likely to be misaligned when assembled. Moreover, if the printed image or graphic does not extend to the edges, then the user cannot align the sheets with the printed image but rather needs to "eyeball" or guess where to position adjacent sheets that form the sign.

In addition, the manual cutting of the unprinted edges may result in an imperfect sign with breaks or gaps in the text or image of the sign. Further along these lines, if the sheets are not square for any reason (e.g., slight distortion of the central print area during removal from the sheet, inaccurate die cutting, etc.), then at least one of the abutting edges will not line up perfectly, thereby leaving a visible gap between sheets. In addition, any shrinkage in the sheets caused by low humidity may cause gaps to form between adjacent sheets. The printing described in the Rudin patent has precise printer page alignment that may not be reliably repeated on each printed page. Finally, old tractor-feed printers could print large rectangular banners; however, the banners were generally of poor quality and limited in height by the standard size of paper utilized by tractor-feed printers.

Accordingly, there is a need for a printing stock and a related system that easily allow a user to print and assemble larger assemblies of the printing stock to form large signs, posters, banners, or the like. The present invention satisfies this need.

BRIEF SUMMARY OF THE INVENTION

The present invention relates to printing stock and a system for printing and forming larger assemblies suitable for displaying a sign or the like. The invention also relates to methods and apparatus for utilizing such printing stock in making signs and to methods for manufacturing such printing stock.

According to one embodiment of the invention and by way of example only, printing stock for use in making a sign includes a face sheet and a backing sheet. The sign is formed from a plurality of sheets of the printing stock, with the sheets arranged in a pattern to form a desired image of the sign. In a number of embodiments, the sheets of printing stock may be received through and printed on by a small-office, home-office (SOHO) printer. In other embodiments, the sheets of printing stock are of standard size for use with SOHO printers, i.e., A4, 8½×11 inches, and legal size. Accordingly, in these embodiments large-scale signs may be made efficiently and easily on a SOHO system.

According to one aspect of the invention, the face sheet includes a printing surface for receiving ink and an adhesive surface for receiving the backing sheet. The face includes a face cut forming a margin and a face sub-sheet such that at least a portion of the margin is separable from the face sub-sheet. The backing sheet may include a backing cut forming a border and a backing sub-sheet such that at least a portion of the border is separable from the backing sub-sheet so that at least a portion of the adhesive surface of the face sheet is exposable.

According to another aspect of the invention, the face may include a plurality of registration marks for enabling the face sub-sheet from one sheet of printing stock that is separated from at least a portion of the margin thereof to be positioned with respect to the face sub-sheet from another sheet of printing stock. Embodiments including registration marks carry the advantage of facilitating the alignment of adjacent sheets of printing stock when forming a composite sign.

In a number of embodiments, the sheets of printing stock may be configured so that a sign may be formed on a surface. In other embodiments, the sheets of printing stock may be configured to form a sign without the need of a dedicated surface; that is, the sheets or portions of the sheets are adhered together. In still other embodiments, a carrier may be provided to which the sheets of printing stock may be applied.

According to still another aspect of the invention, a system for making a sign may include a plurality of sheets of printing stock, a computer with a software program, and a printer. The computer may be configured to process an image into a plurality of sub-images for printing on a corresponding plurality of sheets of printing stock.

In yet another embodiment, printing stock for use in making a sign may include a face sheet and a backing sheet. The face sheet may include a printing surface, an adhesive surface, and a face cut forming a margin and a face sub-sheet. The backing sheet may include a backing cut forming a border and a backing sub-sheet. The backing cut may be form so that when the face sub-sheet is removed, there is a relatively large exposed adhesive portion along one of the sides, with relatively small exposed adhesive portions along the other sides. In addition, sections of the backing cut may extend spatially beyond the face cut to be juxtaposed over the margin of the face sheet, thereby forming one or more tab sections of the backing sub-sheet for facilitating the removal of the backing sub-sheet from the face sub-sheet.

Other features and advantages of the present invention will become apparent to those skilled in the art from a consideration of the following detailed description taken in conjunction with the accompanying drawings.

BRIEF DESCRIPTION OF THE SEVERAL VIEWS OF THE DRAWINGS

FIG. 33D' is a plan view of a back side of the readily adherent face sub-sheet shown in FIG. 33D;

FIG. 37D' is a plan view of a back side of the readily adherent face sub-sheet shown in FIG. 37D;

DETAILED DESCRIPTION OF THE INVENTION

Figure 1:
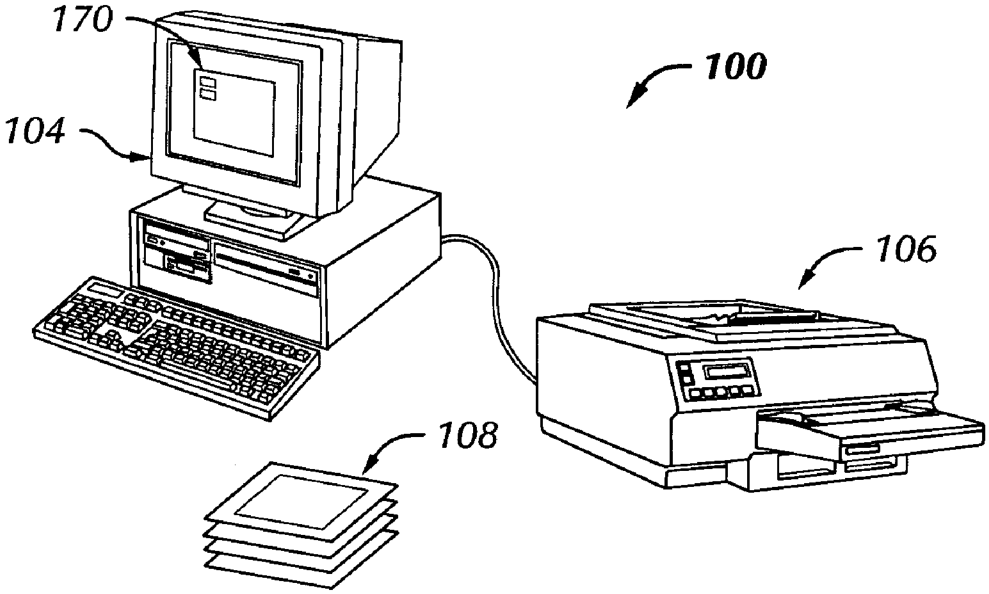
FIG. 1 illustrates a computer and printer system for making a sign with a plurality of sheets of printing stock.
Figure 2:
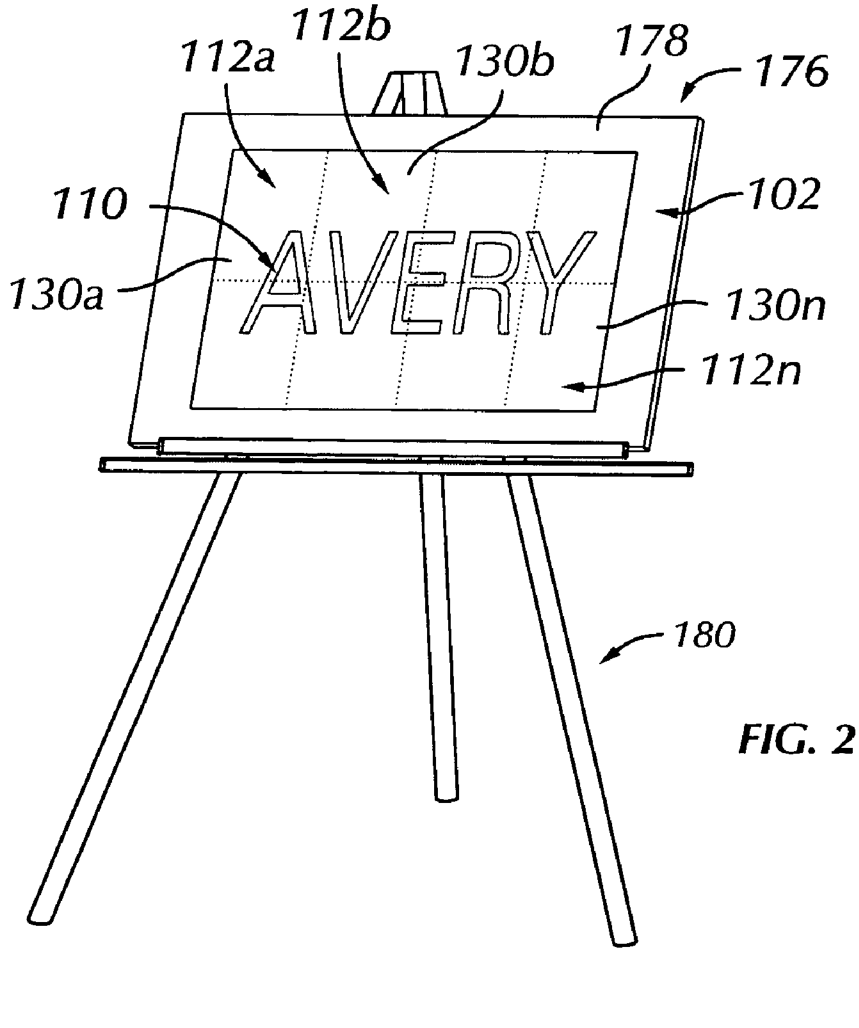
FIG. 2 is a perspective view of a sign with a composite image made according to a number of embodiments.

Referring more particularly to FIGS. 1 and 2 of the drawings, an improved system 100 for printing a sign 102 may include a computer 104, a printer 106, and a plurality of sheets 108 of printing stock. The system 100 may be utilized when it is desired to print a large sign—that is, a sign larger than a single standard-sized sheet of paper (e.g., A4, 8½×11 inches, or legal size)—with a standard small-office, home-office (SOHO) or home printer such as an inkjet printer or a laser printer.

For the purposes of this description, the sign 102 includes a printed composite image 110 comprised of a plurality of printed sub-images 112*a*, 112*b*, . . . , 112*n*. The composite image 110 is represented by "AVERY" in FIG. 2, with each of the sub-images 112 including a respective portion of "AVERY", which will be discussed in detail below.

Figure 3:
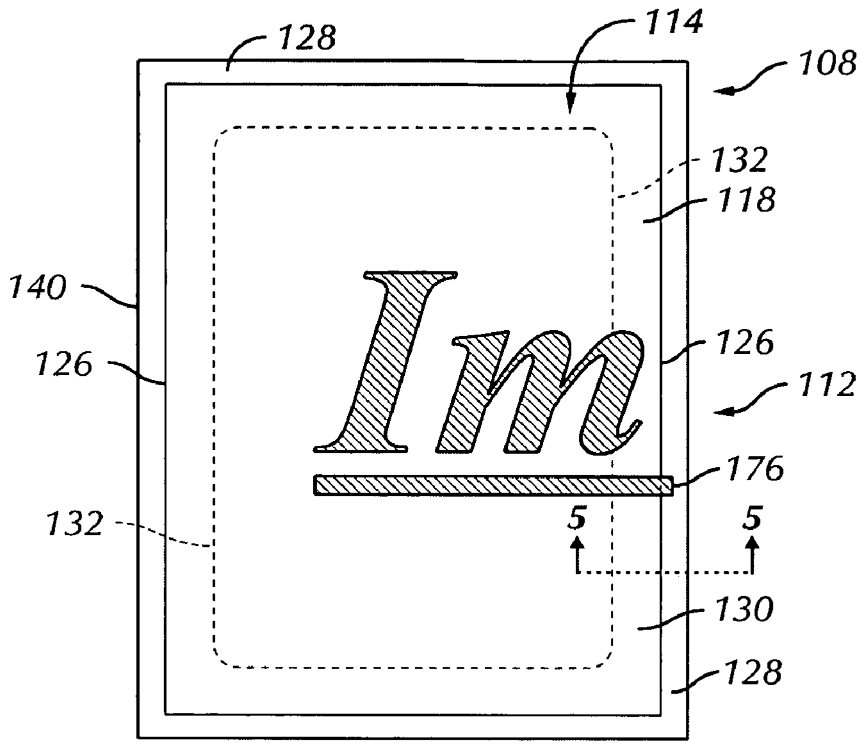
FIG. 3 is a plan view of a face sheet of a sheet of printing stock with a sub-image printed thereon according to a number of embodiments.
Figure 4:
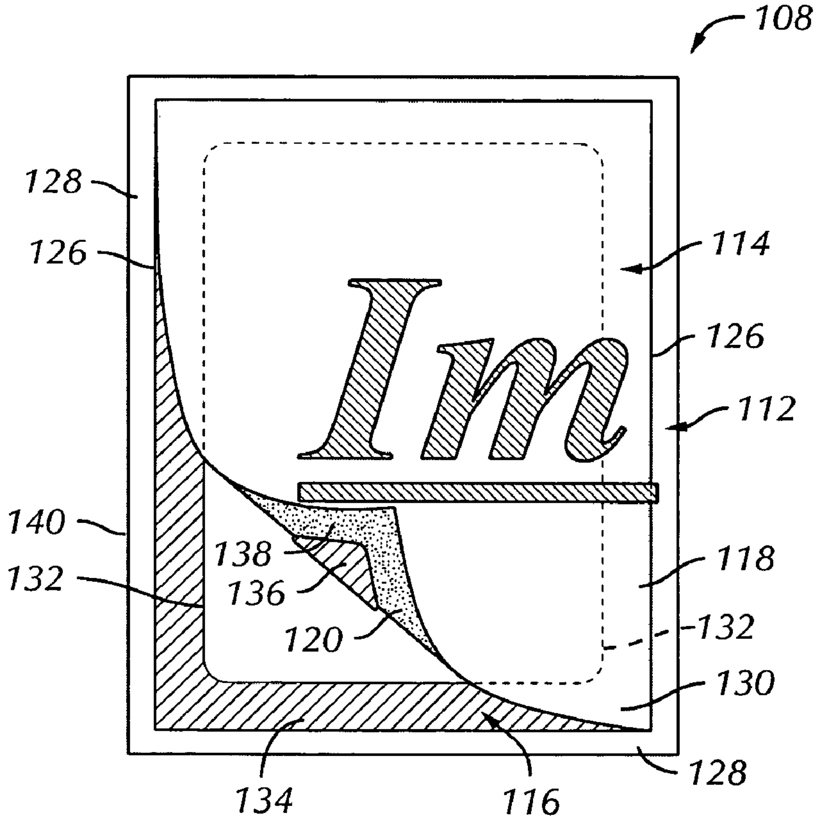
FIG. 4 is a view similar to FIG. 3 with a face sub-sheet peeled away to expose a portion of an adhesive surface thereof.
Figure 5:
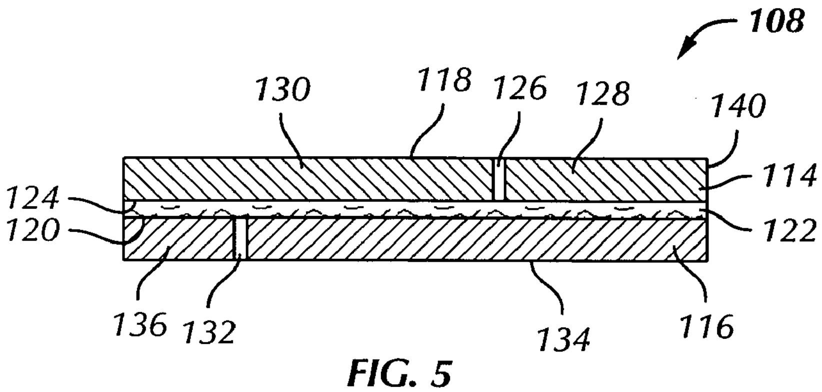
FIG. 5 is a cross-sectional view taken along line 5-5 of FIG. 3.

Referencing FIGS. 3, 4, and 5, each sheet 108 of printing stock may include a face sheet 114 and a backing sheet 116. The face sheet 114 may include a printing surface 118 for receiving ink and an adhesive surface 120 for receiving the backing sheet 116. The adhesive surface 120 is particularly shown in FIG. 4. In some of embodiments, the adhesive surface 120 of the face sheet 108 may include a layer of adhesive 122 applied to a back surface 124 of the face sheet 114 as shown in FIG. 5. As known in the art, the backing sheet 116 may include a release agent (not shown) coated on the side adherent to the adhesive surface 120 of the face sheet 108 to provide a suitable adhesive bond between the backing sheet 116 and the face sheet 114.

The face sheet 114 may also include a face cut 126 that forms or defines a margin 128 and a face sub-sheet 130. The face cut 126 is formed in the face sheet 114 such that the face sub-sheet 130 is separable from the margin 128, as particularly shown in FIG. 4. That is, the face sub-sheet 130 may be removed from the sheet 108 of printing stock. The face cut 126 may include a die cut formed through the face sheet 114 as shown in FIG. 5. Alternatively, the face cut 126 may include perforations, such as microperforations.

According to a number of embodiments, the backing sheet 116 may include a backing cut 132, which is shown in phantom line in FIGS. 3 and 4, that forms or defines a border 134 and a backing sub-sheet 136, which are shown in FIGS. 4 and 5. The backing cut 132 is formed in the backing sheet 116 such that the backing sub-sheet 136 is separable from the border 134 as shown in FIG. 4. In some of the embodiments, the backing sub-sheet 136 is removed from the sheet 108 of printing stock when the face sub-sheet 130 is removed from the sheet 108 by remaining adhered to the adhesive surface 120 of the face sub-sheet 130.

In the embodiment shown in FIGS. 3-5, the face cut 126 may be positioned in the face sheet 114 such that when the face sub-sheet 130 is separated from the margin 128, a portion of the adhesive surface 120 is exposed, which portion is indicated by reference numeral 138 in FIG. 4. For example, the face cut 126 may be spatially positioned between the backing cut 132 and a perimeter 140 of the face sheet 114 and the backing sheet 116. Also in the embodiment shown, the face cut 126 may be generally rectilinear such that the face sub-sheet 130 is rectangular.

In some of the embodiments, the face cut 126 and the backing cut 132 may be substantially concentric about a central region of the sheet 108 of printing stock. As a specific example for a standard-sized sheet 108 of printing stock (e.g., 8½×11 inches), the face cut 126 may be positioned equidistantly about three-eighths of an inch or so from the perimeter 140, which the backing cut 132 may be positioned equidistantly about one inch or so from the perimeter 140.

As known in the art, one of the effects of removing an adhesive label from a release liner or backing sheet is that the act of removing the label causes the label to curl. That is, the label bends where the adhesive is in the process of being separated from the liner. The result is similar to pulling a piece of paper with tension over an edge of a desk. Typically, the greater the adhesive strength, the greater the removal angle, or the thinner the label, the greater the curl will be. However, one of the advantages of this embodiment is that curl is reduced or eliminated. More specifically, as only a portion 138 of the adhesive surface 120 is exposed, less force is required to remove the face sub-sheet 130. In addition, the presence of the backing sub-sheet 136 renders the removed face sub-sheet 120 as a two-layer construction with greater stiffness, thereby bending less during and after removal from the margin 128 and the border 134. The removal of backing sub-sheet 136 also causes less of the face sub-sheet 130 to be separated from the border 134 of the backing sheet 116.

Figure 7:
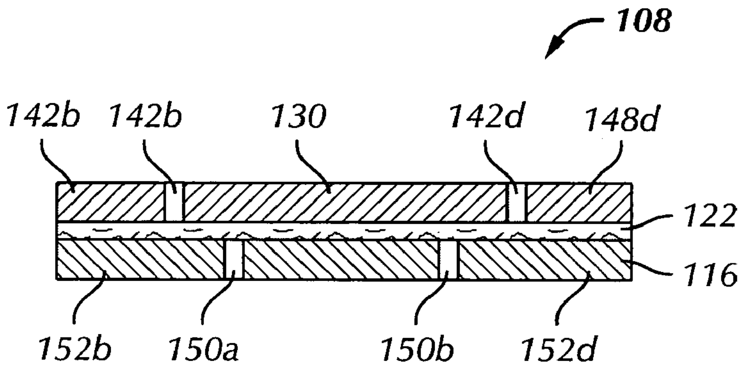
FIG. 7 is a cross-sectional view taken along line 7-7 of FIG. 6.
Figure 6:
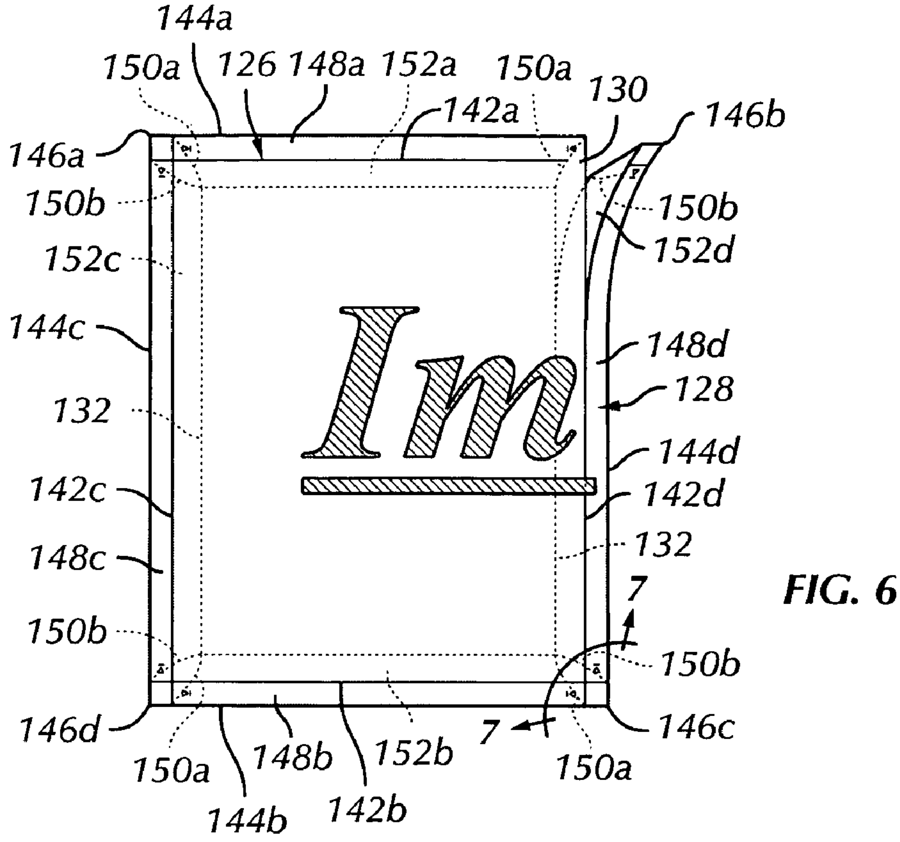
FIG. 6 is a plan view of a face sheet of a sheet of printing stock with a sub-image printed thereon according to a number of other embodiments.

According to other embodiments, such as shown in FIGS. 6 and 7, the face cut 126 may include four edge cuts 142. For the purposes of this description, the face sheet 114 and the backing sheet 116 each has (or collectively have) a top edge 144*a*, a bottom edge 144*b*, and two side edges 144*c* and 144*d*, with respective pairs of the edges 144 intersecting at four corners 146*a*, 146*b*, 146*c*, and 146*d*. The edge cuts 142 may each extend between a respective pair of opposing edges 144 at a distance from a respective one of the edges. Accordingly, in these embodiments, the edge cuts 142 divide the margin 128 into a plurality of margin segments 148*a*, 148*b*, 148*c*, and 148*d*, with each margin segment 148 being individually separable from the other margin segments 148. In other words, at least a portion of the margin 128 may be selectively separated from the other portions of the margin 128.

More specifically, in the embodiment shown, edge cut 142*a* extends between the side edges 144*c* and 144*d* at a distance from the top edge 144*a*, thereby defining margin segment 148*a*; edge cut 142*b* extends between the side edges 144*c* and 144*d* at a distance from the bottom edge 144*b*, thereby defining margin segment 148*b*; edge cut 142*c* extends between the top edge 144*a* and the bottom edge 144*b* at a distance from the left side edge 144*c*, thereby defining margin segment 148*c*; and edge cut 142*d* extends between the top edge 144*a* and the bottom edge 144*b* at a distance from the right side edge 144*d*, thereby defining margin segment 148*d*.

Figure 8:
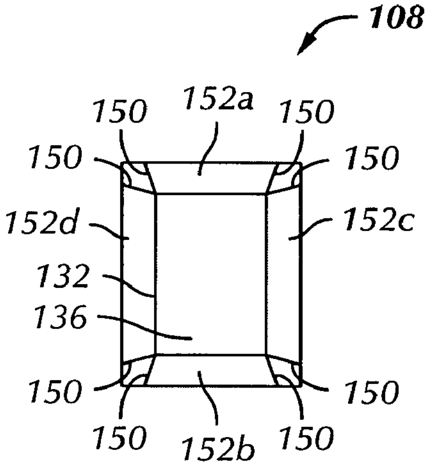
FIG. 8 is a plan view of a backing sheet of the sheet of printing stock of FIG. 6.

In some of the embodiments, the backing sheet 116 may include a plurality of pairs of corner cuts 150*a* and 150*b*, with each of the corner cuts 150 extending from the backing cut 132 to a respective one of the edges 144 of the backing sheet 116, which are shown in phantom line in FIG. 6. Accordingly, in these embodiments, the corner cuts 150 divide the border 134 into a plurality of border segments 152*a*, 152*b*, 152*c*, and 152*d*, which are particularly shown in FIG. 8, with each border segment 152 being individually separable from the other border segments 152. In other words, at least a portion of the border 134 may be selectively separated from the other portions of the border 134.

Figure 10:
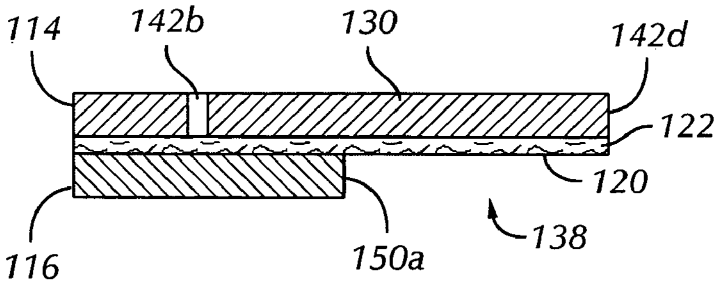
FIG. 10 is a cross-sectional view taken along line 10-10 of FIG. 9.
Figure 9:
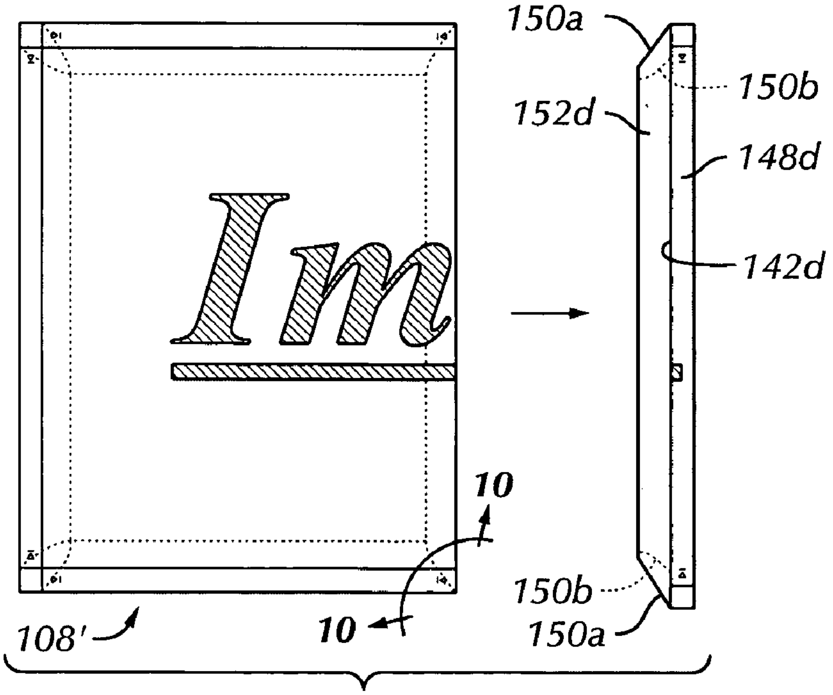
FIG. 9 is a view similar to FIG. 6 with a combination of a margin and a border removed.

To remove one of the border segments 152, such as border segment 152*d* as shown in FIGS. 6 and 9, border segment 152*a* is peeled rearward away along corner cut 150*a* at corner 146*b*, the backing cut 132 along edge 144*d*, and corner cut 150*a* at corner 146*c*. Margin segment 148*d* also peels away from the face sub-sheet 130 along edge cut 142*d*. The combination of margin segment 148*d* and border segment 152*d* is then separated from the remainder of the sheet 108 of printing stock as shown in FIG. 9, thereby leaving a portion of the adhesive surface 120 exposed, which portion is indicated by reference numeral 138 in FIG. 10. The removal of the combination of margin segment 148*d* and border segment 152 from the sheet 108 of printing stock yields a readily adherent sheet of printing stock, which is indicated by reference number 108' in FIG. 9.

The sheets 108 of printing stock configured according to the embodiment shown in FIGS. 6-10 may be utilized in making a sign 102 that does not require adhesion to a surface to which the face sub-sheets 130 are adhered. More specifically, with reference to FIGS. 11 and 12, a sheet 108*a* of printing stock with sub-image 112*a* printed on the face sheet 130 thereof has not had any of the margin segments 148 or the border segments 152 removed and, accordingly, has not had any portion of the adhesive surface 120 exposed. A readily adherent sheet 108*b*' of printing stock with sub-image 112*b* printed on the face sheet 130 thereof may then be adhered to the face sheet 130 of non-adherent sheet 108*a* so that the desired printed composite image 110 is formed. Sheet 108*b*' may be positioned on sheet 108*a* such that the exposed portion 138 of the adhesive surface of sheet 108*b*' is coextensive with a corresponding portion of the face sheet 130 of sheet 108*a*. Accordingly, the resulting sign 102 does not have any exposed portions of adhesive surface.

Another one of the advantages of the embodiment shown in FIGS. 6-12 is that the sign 102 may be adhered to a surface after assembly if desired. For example, a portion of the border segment 152 may be removed to expose a portion 138 of the adhesive surface 120. Alternatively, all of the border segments 152 along the perimeter of the sign 102 may be removed for adhering to a surface. Still alternatively, all of the backing sheet 116 may be removed from the sign 102 to expose the entire adhesive surface 120.

Figure 13:
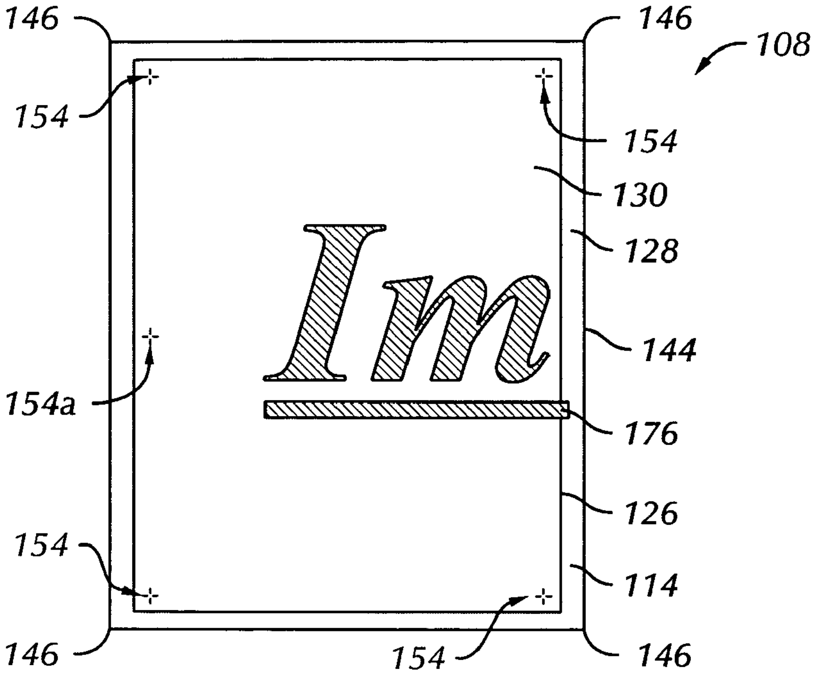
FIG. 13 is a plan view of a face sheet of a sheet of printing stock with a sub-image printed thereon according to a number of still other embodiments.
Figure 14:
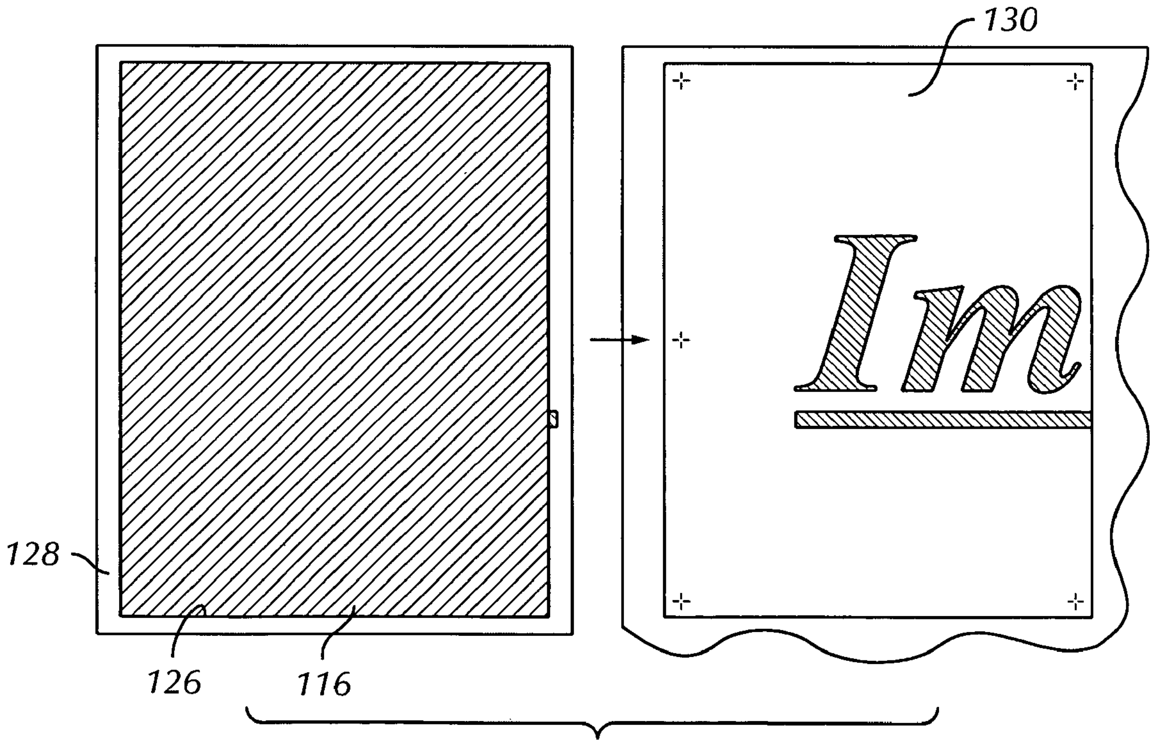
FIG. 14 is a view similar to FIG. 13 illustrating a face sub-sheet removed from the sheet of printing stock and adhered to a surface.

According to still other embodiments, such as shown in FIGS. 13 and 14, the face sheet 114 may include a face cut 126, while the backing sheet 116 is free of any backing cut. Accordingly, when removed from the sheet 108 of printing stock, the face sub-sheet 130 is separated from the entire backing sheet 116 and the margin 128 as shown in FIG. 14, with the entire extent of the adhesive surface 120 of the face sub-sheet 130 being exposed. In a number of embodiments, the face sheet 114 may include one or more registration marks 154 that may be utilized in assembling the plurality of sheets 108 of printing stock that have been printed on to form the sign 102.

Figure 15:
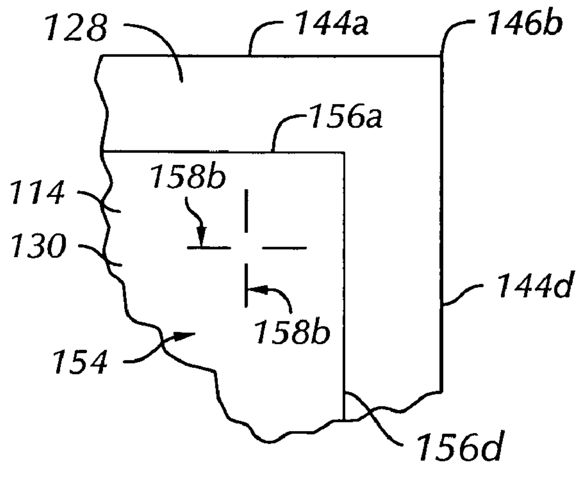
FIG. 15 is an enlarged fragmentary view of a corner of a sheet of printing stock with registration marks according to some of the embodiments.

For example, with reference to FIGS. 13, 14, and 15, the face sheet 114 may include a plurality of registration marks 154. In the embodiments shown in these figures, the registration marks 154 may be disposed at or near each of the four corners 146 of the face sheet 114. In other embodiments, the registration marks 154 may be disposed near the face cut 126 and any location along the extent thereof, for example, as indicated by reference numeral 154*a* in FIG. 13. One of the advantages of utilizing registration marks 154 is that a user is enabled to quickly and accurately arrange, position, or align adjacent sub-sheets 130 to form a sign, which is discussed in more detail below. This is particularly useful when the printed image or graphic does not extend all the way to the edge of the sub-sheet 130, in that a user may utilize the registration marks 154 to align adjacent sub-sheets 130.

Figure 16:
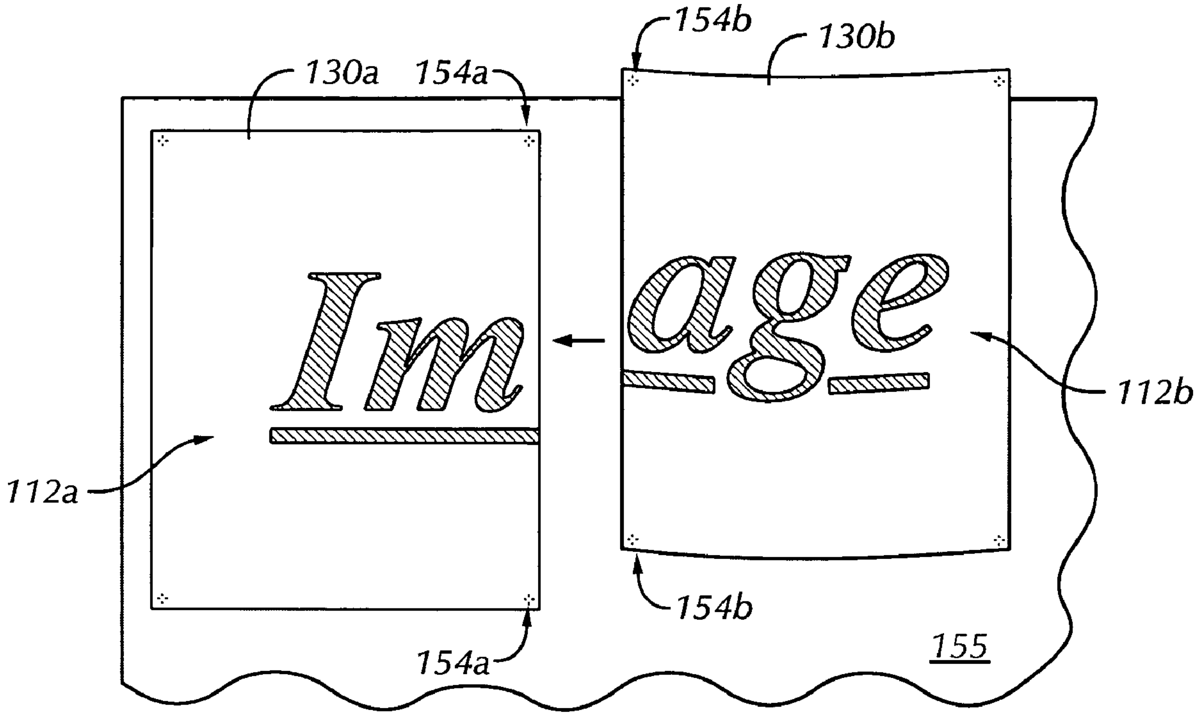
FIG. 16 is a view similar to FIG. 14 illustrating another sheet being align with a sheet already adhered to a surface.
Figure 17:
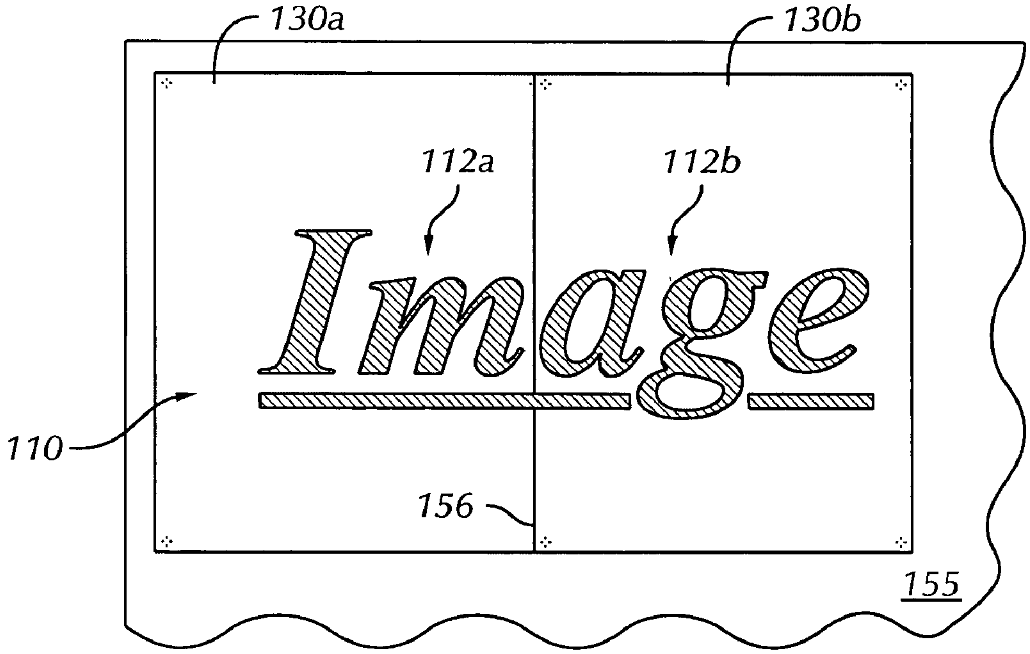
FIG. 17 is a view similar to FIG. 16 illustrating the two sheets align and adhered to the surface.

As mentioned, the registration marks 154 may be used during the assembly of the sign 102. More specifically, the registration marks 154 may aid, guide, or enable the face sub-sheet 130 from one of the sheets 108 of printing stock that is separated from the margin 128 thereof to be positioned on a surface with respect to a face sub-sheet 130 from another one of the sheets 108 of printing stock that is already adhered to the surface. For example, as shown in FIG. 16, a face sub-sheet 130*a* with a printed sub-image 112*a* is adhered to a surface 155. A subsequent face sub-sheet 130*b* with a complementary printed sub-image 112*b* may then be positioned adjacent to, coextensively or overlapping along a common edge with, or in an otherwise composite relationship with the already adhered face sub-sheet 130*a*, with the subsequent face sub-sheet 130*b* then being adhered to the surface 155, such that the desired printed composite image 110 is formed, as shown in FIG. 17.

This desired or predetermined position may be attained by aligning an edge 156 of the subsequently adhered face sub-sheet 130*b* with the registration marks 154*a* of the already adhered face sub-sheet 130*a*. Thereafter, adjustments may be made if needed to further align the printed image or text to compensate as needed for printer variation, mis-registration, and/or skewing. In this regard, in some of the embodiments, the registration marks 154 may include one or more alignment elements 158 respectively disposed substantially parallel to one of the edges 144 of the face sheet 114 or one of the edges 156 of the face sub-sheet 130, which is particularly shown in FIGS. 15 and 18. For example, alignment mark 158*a* is substantially parallel to edge 156*d* of the face sub-sheet 130 (and edge 144*d* of the face sheet 114), and alignment mark 158*b* is substantially parallel to edge 156*a* of the face sub-sheet 130 (and edge 144*a* of the face sheet 114). Accordingly, as represented in FIGS. 16 and 17, the registration marks 154 enable a face sub-sheet 130*b* that is to be subsequently positioned to be overlapped on top of an already positioned face sub-sheet 130*a*, and then to be moved to make adjustments as needed to more properly align the image 112 to compensate for minor mis-registration or skewing.

Figure 18:
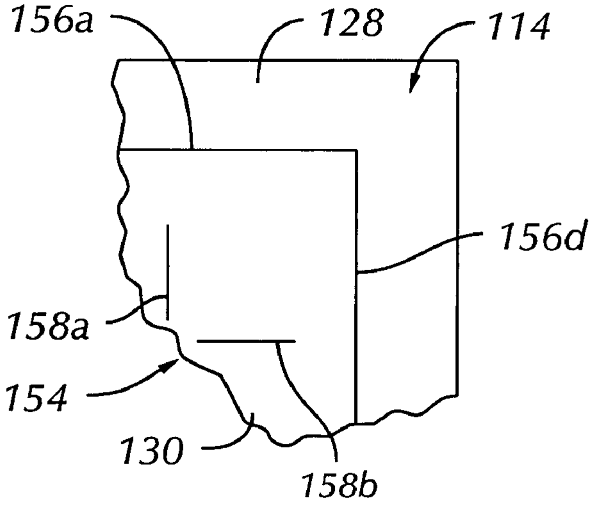
FIG. 18 is an enlarged fragmentary view of a corner of a sheet of printing stock with registration marks according to other embodiments.
Figure 19:
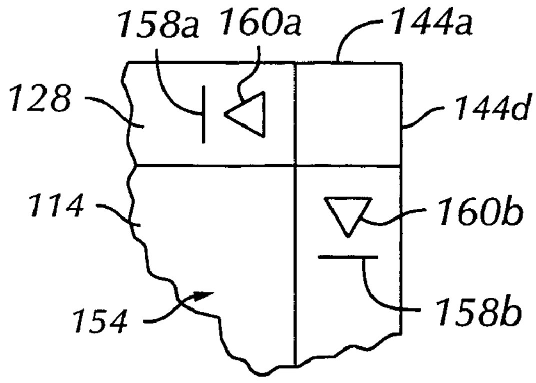
FIG. 19 is an enlarged fragmentary view of a corner of a sheet of printing stock with registration marks according to still other embodiments.

In some of the embodiments, the registration marks 154 may include a pair of alignment elements 158, such as shown in FIG. 18. In other embodiments, the registration marks 154 may include a plurality of alignment elements 158 disposed in a cross-hair pattern, such as shown in FIG. 15. In still other embodiments, such as shown in FIG. 19, the registration marks 154 may include a directional element 160*a* and 160*b* disposed near a respective one the alignment elements 158*a* and 158*b*, with the direction elements 160 indicating a directional positioning of a subsequently adhered face sub-sheet 130.

As shown in the embodiments in FIGS. 15 and 18, the registration marks 154 may be disposed on the face sub-sheet 130 of the face sheet 114. Alternatively, as shown in FIG. 19, the registration marks 154 may be disposed on the margin 128 of the face sheet 114. In some of the embodiments, the alignment elements 158 may be disposed equidistantly from a respective pair of edges 156 (or 144) at one of the corners 146 (e.g., alignment elements 158*a* and 158*b* disposed equidistantly from edges 156*d* and 156*a* at corner 146*b*). In addition, the registration marks 154 may include perforations or may be die cut into the face sheet 114. Alternatively, the registration marks 154 may be applied to the printing surface 118 when the sub-image 112 is applied to the printing surface 118, which will be discussed in more detail below.

Figure 20:
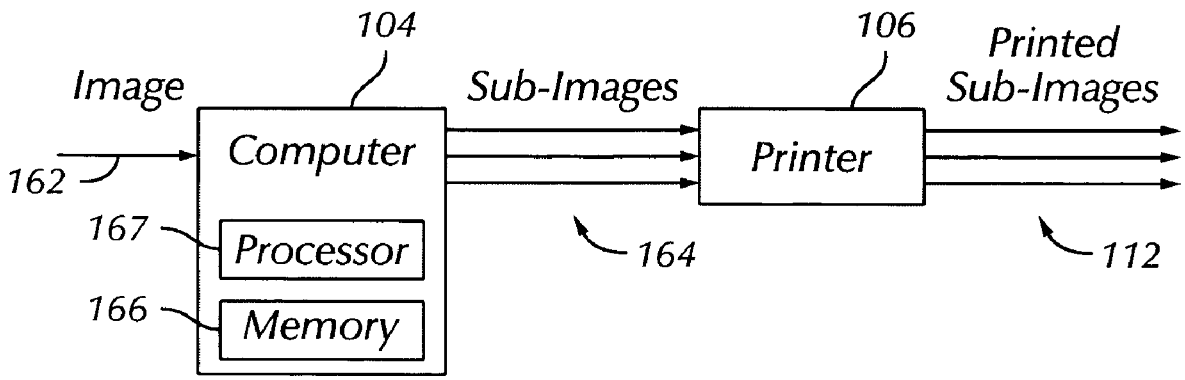
FIG. 20 is a block diagram illustrating a computer and printer system for processing and printing an image according to a number of embodiments.
Figure 21:
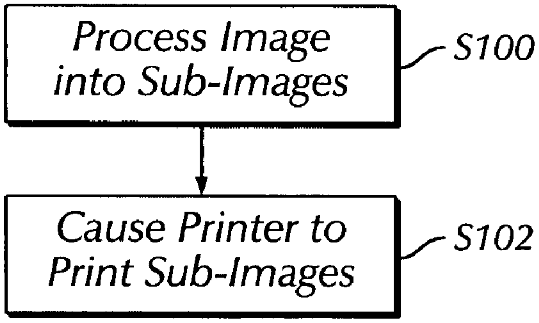
FIG. 21 is a flow chart illustrating computer methodology according to a number of embodiments.

With reference to FIGS. 20 and 21, in a number of embodiments, the computer 104 may be configured to process a digital image 164 into a plurality of digital sub-images 164 (step S100). Accordingly, the computer 104 may then cause the printer 106 to print the plurality of sub-images 164 (step S102) on a respective plurality of sheets 108 of printing stock (see FIG. 1). Accordingly, with further reference to FIG. 2, when the face sub-sheets 130*a*, 130*b*, . . . , 130*n* of the respective plurality of sheets 108 of printing stock are arranged in a predetermined pattern, the sign 102 is formed. The sign 102 includes the printed sub-images 112*a*, 112*b*, . . . , 112*n* arranged in the desired composite printed image 102 corresponding to the originally processed image 162.

Figure 22:
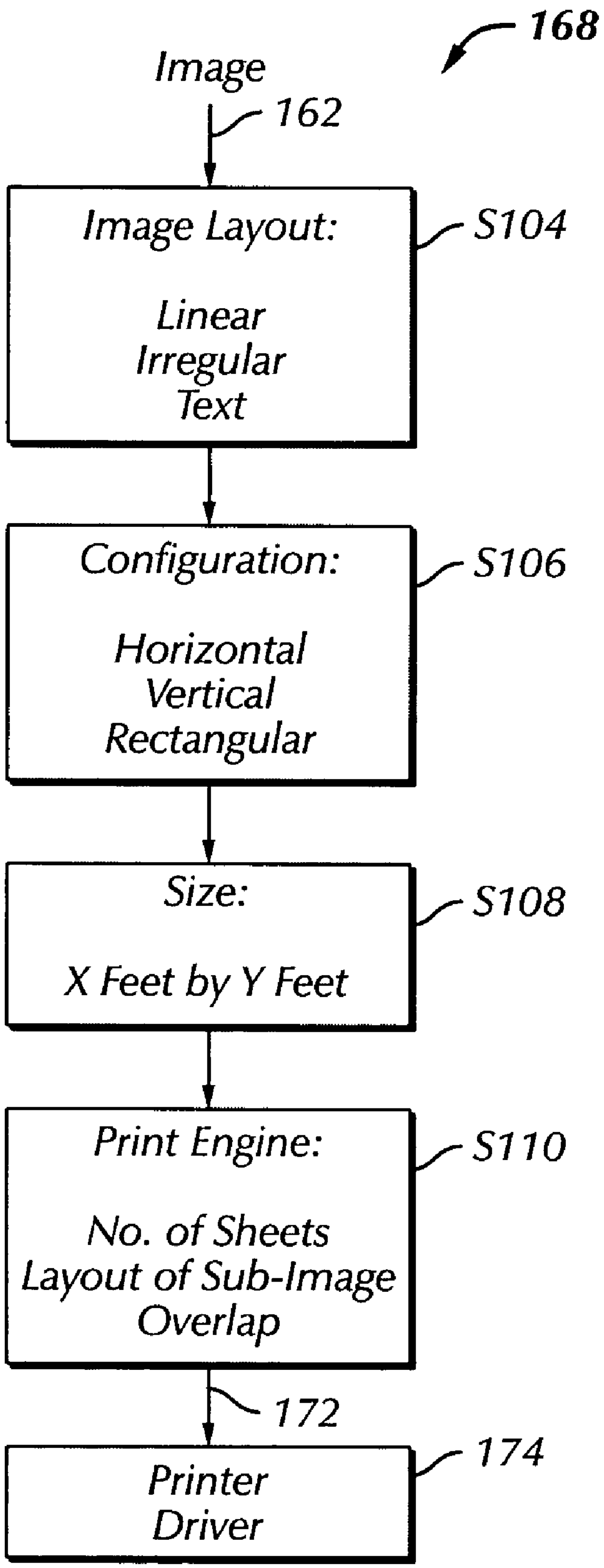
FIG. 22 schematically illustrates a software engine according to a number of embodiments.

In some of the embodiment, a software program may be loaded onto the computer in a memory 166 for execution by a processor 167. The software may process the image 162 to generate one or more sets of digital sub-images 164 that may be appropriately used to form the sign 102. More specifically, with reference to FIG. 22, a software engine 168 according to a number of embodiments may process the image 162 to determine a layout of the image (step S106). For example, the layout of the image 162 may be characterized by being linear (e.g., horizontally or vertically), irregular (e.g., square, circular, or triangular), or text only. For the purposes of this description, the word "image" is used to indicate any type of output that may be printed on the sheets 108 of printing stock, including images, graphics, text, or any combination thereof. Accordingly, if the image 162 contains only text, then the software engine 168 may determine that the image 162 may be linear (e.g., no wrapping of text) or rectangular (e.g., wrapping of text).

Figure 23:
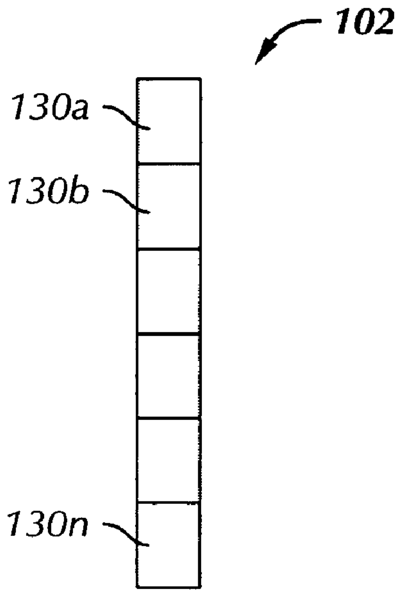
FIG. 23 illustrates a sign characterized by verticality.
Figure 24:
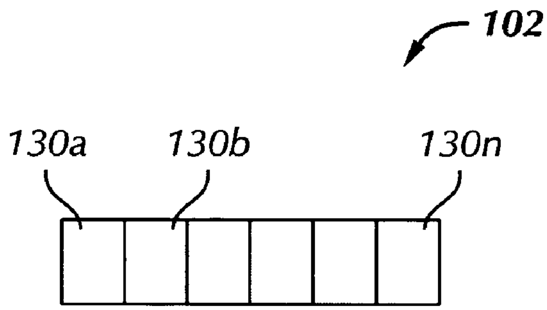
FIG. 24 illustrates a sign characterized by horizontality.
Figure 25:
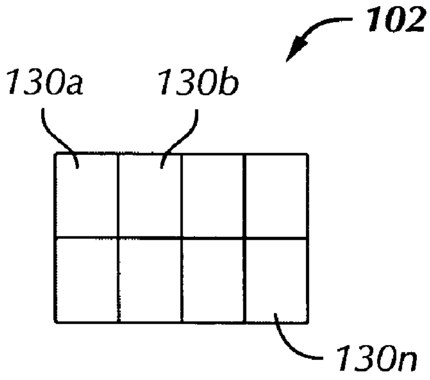
FIG. 25 illustrates a sign characterized by rectangularity.

The software engine 168 may also process the image 162 to determine a configuration of the image (step S106). For example, the configuration of the image 162 may be characterized by being horizontal (e.g., unwrapped text), vertical, or rectangular. If the image 162 is characterized by verticality, then the software engine 168 may determine that the plurality of face sub-sheets 130 with the sub-images 112 should be arranged in a vertical pattern as shown in FIG. 23 to form the sign 102. Further, if the image 162 is characterized by horizontality, then the software engine 168 may determine that the plurality of face sub-sheets 130 with the sub-images 112 should be arranged in a horizontal pattern as shown in FIG. 24 to form the sign 102. In addition, Further, if the image 162 is characterized by rectangularity, then the software engine 168 may determine that the plurality of face sub-sheets 130 with the sub-images 112 should be arranged in a rectangular pattern as shown in FIG. 25 to form the sign 102.

In other embodiments, the software engine 168 may process the image 162 in consideration of size (step S108). To do so, a user may enter a desired size in the computer 104 through a user interface 170 (see FIG. 1), for example, x feet by y feet, such that the printed image 110 is characterized by size.

The software engine 168 may then utilize these characteristics of the image 162 and the desired printed image 110 to determine one or more sets 172 of digital sub-images 164 that may be appropriately used to form the sign 102 in a print engine (step S110). For example, the software engine 168 may determine the number of sheets 108 of printing stock that are required to form a sign 102 with the desired printed image 110. In addition, the software engine 168 may determine a layout of each of the sub-images 112 on the face sheet 130 to achieve the desired composite image 110. If more than one set 172 of digital sub-images will satisfactorily form the composite image 110, then the software engine 168 may query a user through the interface 170 which exemplary set 172 to use. The selected or most appropriate set 172 of digital sub-images 164 may then be output to a print driver 174.

Figure 11:
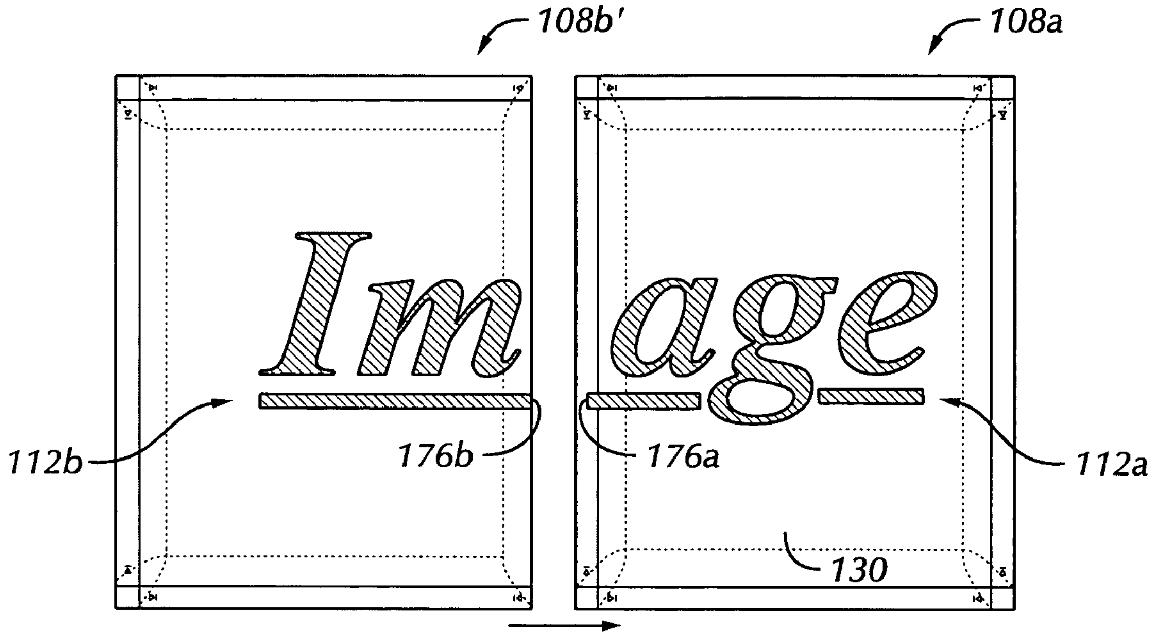
FIG. 11 is a plan view of the sheet of FIG. 9 aligned with a sheet of printing stock with a corresponding sub-image.
Figure 12:
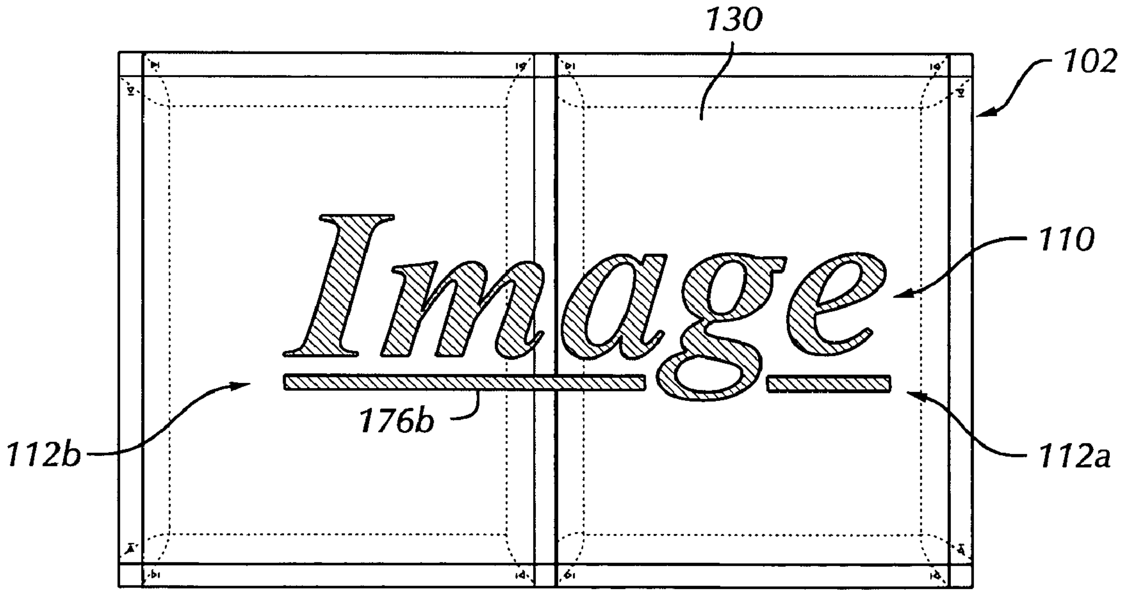
FIG. 12 is a view similar to FIG. 11 with the two sheets adhered together.

In some of the embodiments, the software engine 168 may determine an overlap in adjacent sub-images 112 so that when the face sub-sheets 130 are arranged in the predetermined pattern to form the sign, there will be no breaks in the composite image 110. More specifically, as shown in FIG. 11, sub-image 112*a* of sheet 108*a* may include an overlap 176*a* along the side of sheet 108*a* that will be adjacent to or mated with sheet 108*b*'. Similarly, sub-image 112*b* of sheet 108*b*' may include an overlap 176*a* along the side of sheet 108*b*' that will be adjacent to or mated with sheet 108*a*. Accordingly, as shown in FIG. 12, when sheet 108*b*' is adhered to sheet 108*a*, overlap 176*b* overlays and aligns with overlap 176*a* so that the resulting composite image 110 is complete and without breaks. An overlap 176 is also illustrated in FIGS. 3 and 13. The overlapping of the sheets 108 may compensate for and enable correct alignment when minor variations in print registration and minor skewing of the image or text are present on the sheets 108.

Referring to FIG. 2, according to a number of embodiments, a kit for making a sign may include a plurality of the sheets 108 of printing stock. In addition, the kit may include a carrier 176 on which the adhesive surface 120 of the face sheets 130 is adherent. In some of the embodiments, the carrier 176 may include a releasably adherent adhesive or, alternatively, an application surface 178 that is releasably adherent with the adhesive surface 120 of the face sheets 130, so that the carrier 176 may be used repeatedly for subsequently produced signs. Further, the kit may include an easel 180 for holding the carrier 176. In another embodiment, the carrier 176 may have an adhesive surface to which non-adhesive sheets having a weakening line forming a margin and a face sub-sheet may be releasably adhered.

Figure 26:
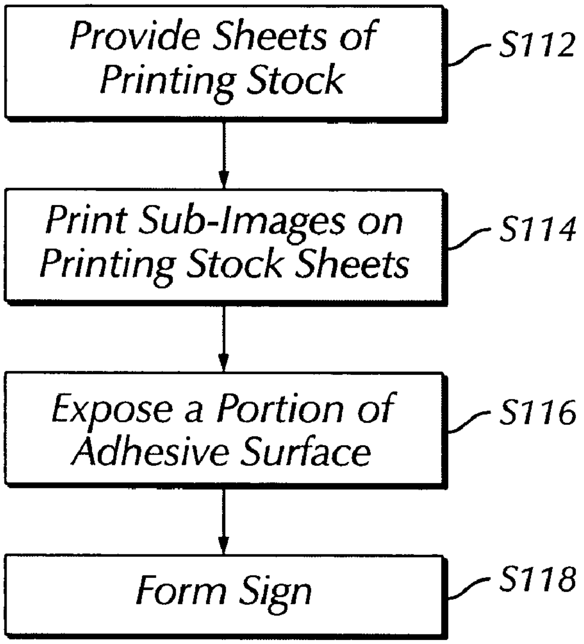
FIG. 26 is a flow chart illustrating user methodology according to a number of embodiments.

Referencing FIG. 26, to make the sign 102 from a user's point of view may include providing a plurality of sheets 108 of printing stock (step S112). The user may then select or create a desired image 162 for the sign 102, for example, through the user interface 170. The user may then print the sub-images 112 on a respective plurality of the sheets 108 of printing stock (step S114). The user may then expose a portion (e.g., portion 138 in FIG. 4) of the adhesive surface 120 (step S116) by, for example, removing at least a portion of the border 134 of the backing sheet 116. The user may then form the sign 102 (step S118) by adhering the exposed portion 138 of the adhesive surface 120 to the printing surface 128 of the face sheet 114 of another one of the printed sheets 108 of printing stock such that the sub-images 112 form the composite image 110. In embodiments where the face sheets 130 include registration marks 154, the user may align the face sheet 130 with the exposed portion 138 of the adhesive surface 120 with the registration marks 154 and the printed image or text of the another one of the printed sheets 108 of printing stock.

Figure 28:
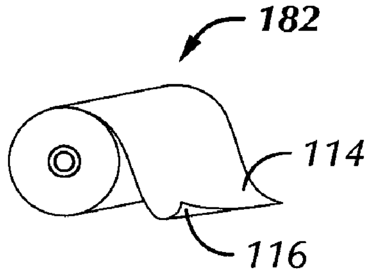
FIG. 28 is a perspective view of a roll of uncut printing stock.
Figure 27:
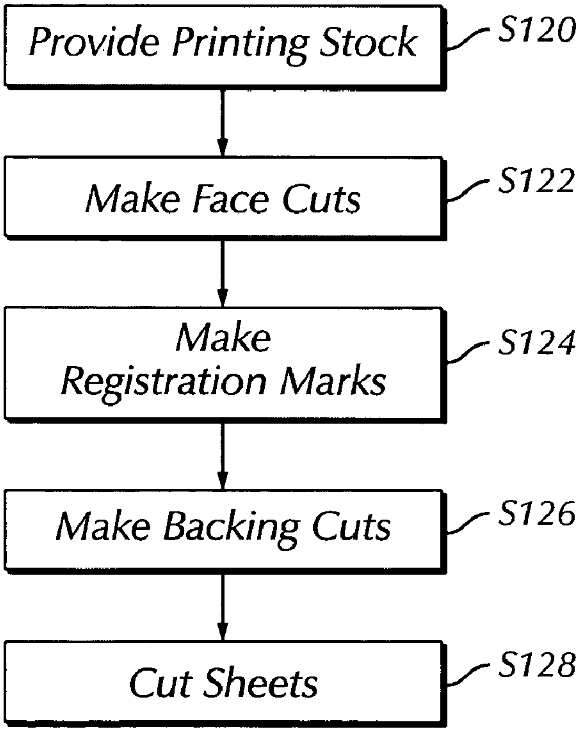
FIG. 27 is a flow chart illustrating manufacturing methodology according to a number of embodiments.

With reference to FIG. 27, from a production standpoint, the sheets 108 of printing stock may be manufactured by first providing uncut printing stock (step S120), such as a roll of printing stock 182 as shown in FIG. 28 including a continuous face sheet 114 and backing sheet 116. A plurality of face cuts 126 may then be made through the face sheet 114 (step S122) to form a plurality of the margins 128 and a corresponding plurality of the face sub-sheets 130. A plurality of backing cuts 132 may then be made through the backing sheet 116 (step S124) to form a plurality of the borders 134 and a corresponding plurality of the backing sub-sheets 136. In addition, a plurality of registration marks 154 may be made (step S126). In embodiments in which the registration marks are die cut, the registration marks 154 may be made at the same time the face cuts 126 are made (i.e., at step S122). The printing stock may then be cut into the sheets 108 of printing stock (step S128) such that each of the sheets 108 of printing stock includes a face cut and a backing cut. As mentioned, in a number of embodiments, the sheets 108 are cut standard sizes (e.g., A4, 8½×11 inches, and legal size) to be receivable through a SOHO printer.

Figure 28A:
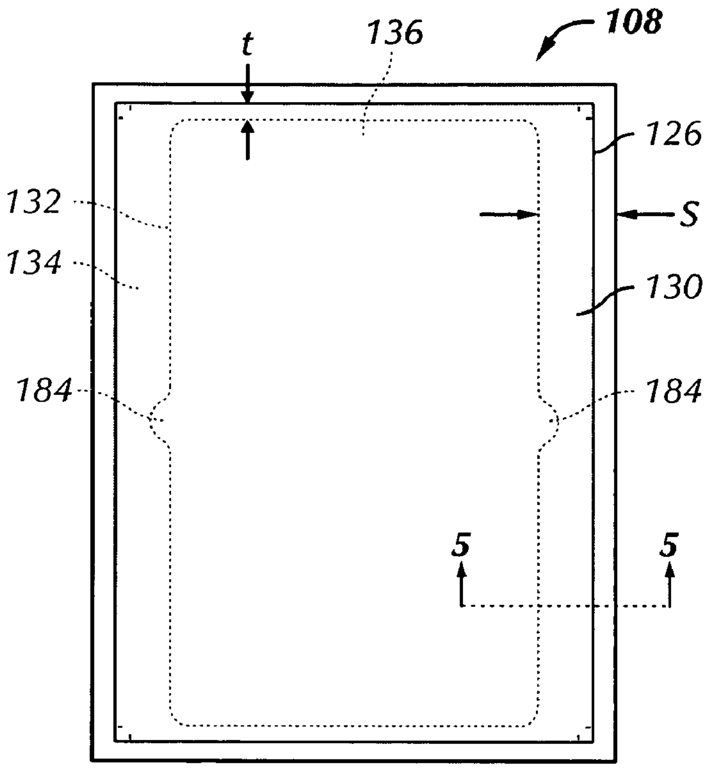
FIG. 28A is a plan view of a sheet of printing stock according to a number of still other embodiments.
Figure 29:
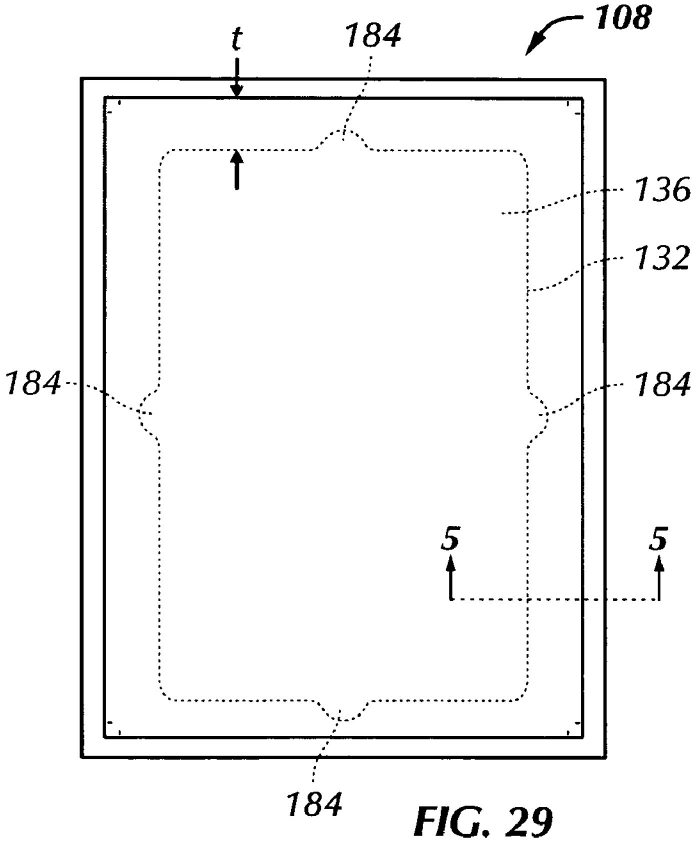
FIG. 29 is a plan view of a sheet of printing stock according to still other embodiments.

Additional embodiments of sheets 108 of printing stock are illustrated in FIGS. 28A and 29. In the embodiments shown, the sheet 108 may include a backing cut 132 in the backing sheet 116 (see FIG. 5) such that a backing sub-sheet 136 may include one or more projections 184. As shown in the embodiment of FIG. 28, one projection 184 may be formed in each opposing side of the backing sub-sheet 136. Alternatively, as shown in the embodiment of FIG. 29, one projection 184 may be formed in each of the four sides of the backing sub-sheet 136. The projections 184 may be semi-circular as shown, or may be oval, elliptical, rectilinear, free form, or any other shape.

When assembling a sign 102 with the border 134 removed from the backing sheet 116, the face sub-sheet 130 with the backing sub-sheet 136 may be positioned on a surface 155 (see, e.g., FIG. 16) and aligned with one or more sheets already in place on the surface if such sheets are present. The exposed adhesive portion 138 (see, e.g., FIG. 4) along one side (e.g., the left side) may be adhered to both the adjoining already-mounted face sub-sheet 130 and the surface 155.

Figure 30:
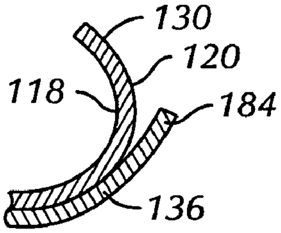
FIG. 30 is a cross-sectional view of a projection of a backing sub-sheet peeling away from a face sub-sheet.

With reference to FIG. 30, the unadhered opposing side (e.g., the right side) may then be bent back toward the face sub-sheet 130. Because of the stiffness of the backing sub-sheet 136 and the strength adhesive bond between the adhesive surface 120 and the backing sub-sheet 136, the projection 184 may separate from the adhesive surface 120 of the face sub-sheet 130 as shown in FIG. 30, thereby providing a finger tab for grasping to facilitate the removal of the backing sub-sheet 136. In addition to this feature, the projections 184 may further provide a visual cue to a user to remove the backing sub-sheet 136 prior to adhering the entire exposed adhesive portion 138 to the surface.

With further reference to FIGS. 28 and 29, the backing cut 132 may be made in the backing sheet 116 so that a relatively narrow border 134 is defined in the backing sub-sheet 116 along one or more sides, for example, a top and bottom side as shown in FIG. 28. In this regard, a relatively narrow exposed portion 138 of the adhesive surface 120 results when the border 134 is removed, as indicated by reference alpha t in these two figures, with a relatively small or narrow exposed portion 138 resulting from the embodiment shown in FIG. 28, in comparison to a relatively large exposed portion resulting from the embodiment shown in FIG. 29 (and in comparison to a relatively large border indicated by alpha s in FIG. 28). The narrow exposed portion 138 is preferably defined along the shorter sides, namely, the top and bottom sides, so that it is easier to fold back the face sub-sheet 130 to remove the backing sub-sheet 136. Alternatively, the sheet 108 may include an asymmetrical backing sub-sheet 136 so that only a single narrowed exposed portion 138 is defined along one of the sides. In some of the embodiments, the relatively narrow portion t indicated in FIG. 28 may be on the order of less than about one inch.

Figure 31:
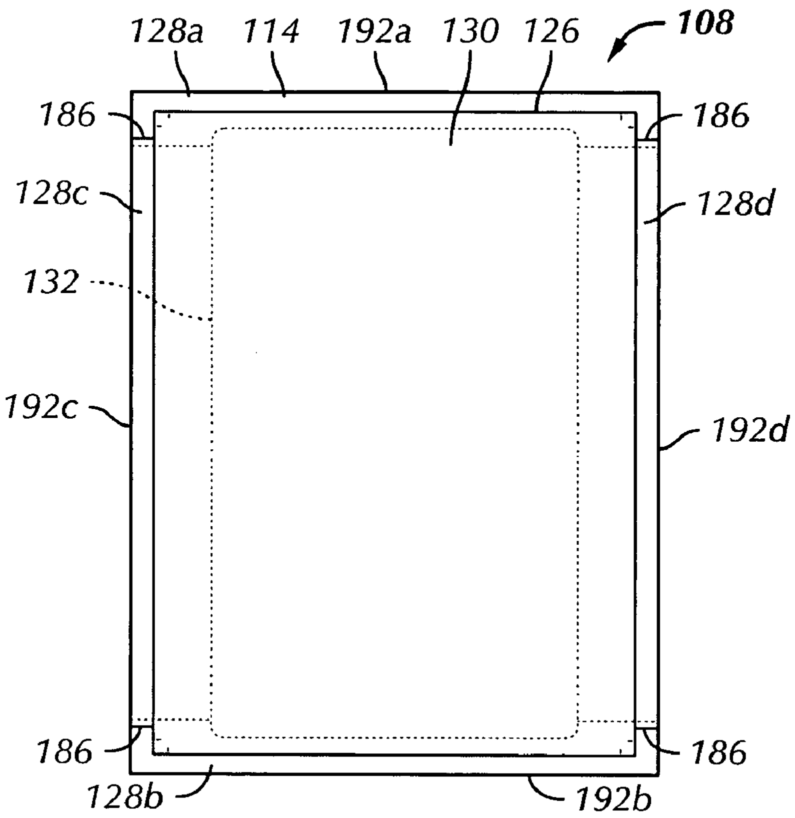
FIG. 31 is a plan view of a front side of a sheet of printing stock according to still further embodiments.

With reference to FIG. 31, in still other embodiments a sheet 108 of printing stock may include a face sheet 114 with a primary face cut 126 defining the face sub-sheet 130 and one or more secondary face cuts 186 formed through the margin 128 between the primary face cut 126 and an outer edge of the face sheet 114. In some of the embodiments, the secondary face cuts 186 may be formed near the corners of the face sheet 114, for example, positioned in the left and right margins 128 and spaced from the top and bottom edges by less than a few inches. The secondary face cuts 186 may be continuous cuts or, alternatively, may be perforated. The secondary face cuts 186 may be described as defining a top margin 128*a*, a bottom margin 128*b*, a left margin 128*c*, and a right margin 128*d*.

Figure 32:
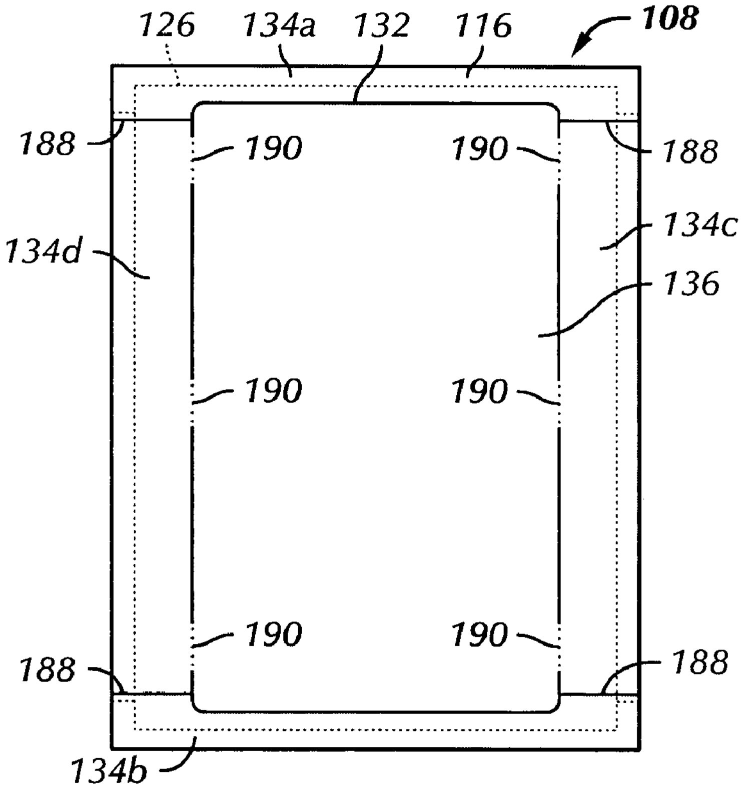
FIG. 32 is a plan view of a back side of the sheet of FIG. 31.

As shown in FIG. 32, the backing sheet 116 may include a primary backing cut 132 defining the backing sub-sheet 136 and one or more secondary backing cuts 188 formed through the border 134 between the primary backing cut 132 and an outer edge of the backing sheet 116. In some of the embodiments, the secondary backing cuts 188 may be formed near the corners of the backing sheet 116, for example, positioned in the left and right borders 134 and spaced from the top and bottom edges by less than a few inches. The secondary backing cuts 188 may be continuous cuts or perforated. The secondary backing cuts 188 may be described as defining a top border 134*a*, a bottom border 134*b*, a left board 134*c*, and a right border 134*d*.

As shown in FIG. 31 and described in more detail below, the margins 128 and the borders 134 define in the sheet 108 a top section 192*a* (including the top margin 128*a* and the top border 128*b*), a bottom section (including the bottom margin 128*b* and the bottom border 134*b*), a left side section 192*c* (including the left margin 128*c* and the left border 128*c*), and a right side section 192*d* (including the right margin 128*d* and the right border 134*d*).

In a number of embodiments the primary face cut 132 may include a plurality of perforated sections 190 indicated by dashed line in FIG. 32. The perforated sections 190 may be positioned along at least two of the four portions (i.e., top, bottom, left, and right) of the primary backing cut 132, for example, along the left portion and the right portion of the primary backing cut 132 as shown. Also as shown, the primary backing cut 132 may include three perforated sections 190 per side and spaced substantially equidistantly. The perforated sections 190 may be described as providing a weakened bond between the backing sub-sheet 136 and the border 134 of the backing sheet 116.

Figure 33A:
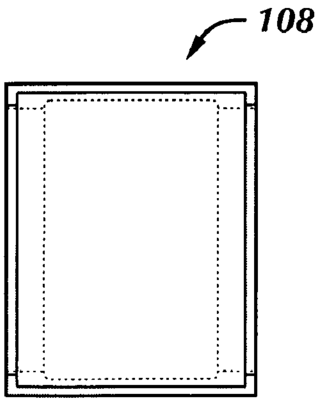
FIGS. 33A to 33H illustrate methodology for applying a face sub-sheet of the sheet of printing stock shown in FIGS. 31 and 32 to a surface according to some of the embodiments.
Figure 33B:
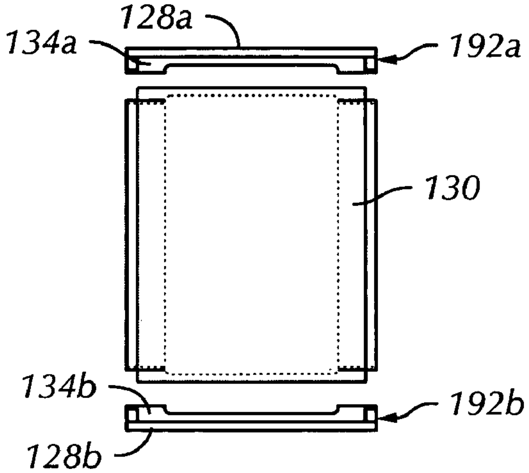
Figure 33C:
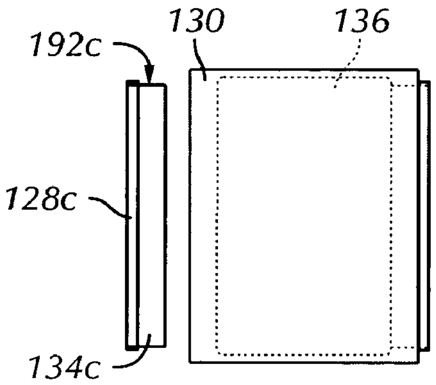
Figure 33D:
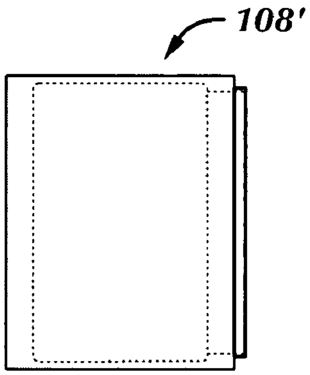
Figure 33D:
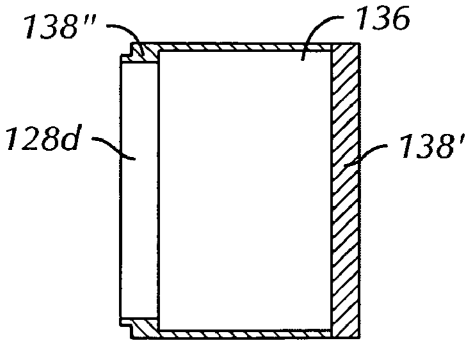

With continued reference to FIGS. 31 and 32 and additional reference to FIGS. 33A to 33H, after the sheet 108 has been printed upon with a sub-image 112 (not shown in FIG. 33A; see, e.g., FIG. 3), the top and bottom section 192*a* and 192*b* may be removed, for example, by peeling the sections 192 rearward and away from the face sub-sheet 130, as shown in FIG. 33B. One of the side sections 192*c* or 192*d*, e.g., the left side section 192*c*, may then be removed as shown in FIG. 33C, for example, by holding the face sub-sheet 130 and the backing sub-sheet 136 together while pulling the side section 192 away and breaking the perforated sections 190, thereby yielding a readily adherent sheet 108' as shown in FIG. 33D.

As shown in FIG. 33D', with the removal of the left side sections 192*c*, the readily adherent sheet 108' includes a relatively large exposed adhesive portion 138' indicated by cross hatching. And with the removal of the top and bottom sections 192*a* and 192*b*, the readily adherent sheet 108' includes a relatively small exposed adhesive portion 138" indicated by contrasting cross hatching.

Figure 33E:
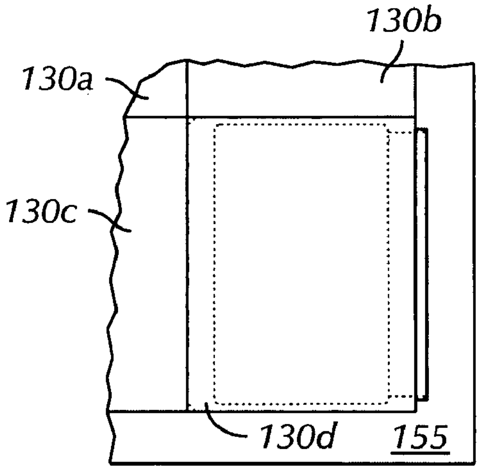

As shown in FIG. 33E, the readily adherent sheet 108' may then be adhered to a surface 155. If other face sub-sheets 130 have already been adhered to the surface 155 (e.g., face sub-sheets 130*a*, 130*b*, and 130*c* as shown in FIG. 33E), then the readily adherent sheet 108' may be aligned therewith as described above, e.g. by overlapping face sub-sheet 130*d* onto the already positioned face sub-sheets 130*b* and 130*c*. The face sub-sheet 130*d* may then be adjusted in position if needed to correct for mis-registration in the image or graphics printed thereof.

Figure 33F:
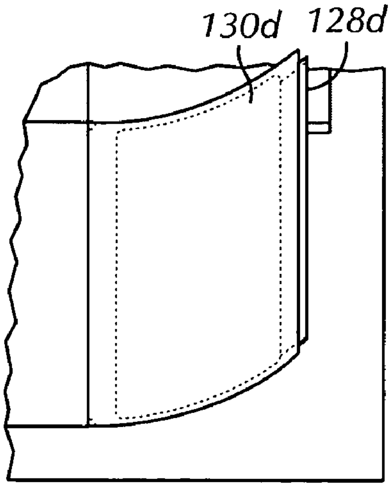
Figure 33G:
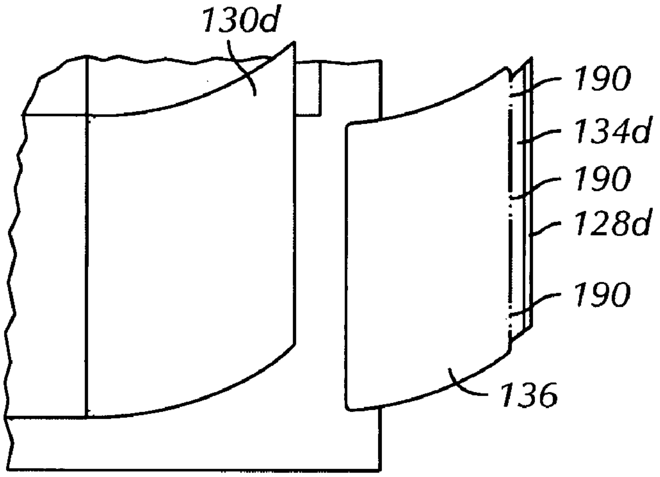
Figure 33H:
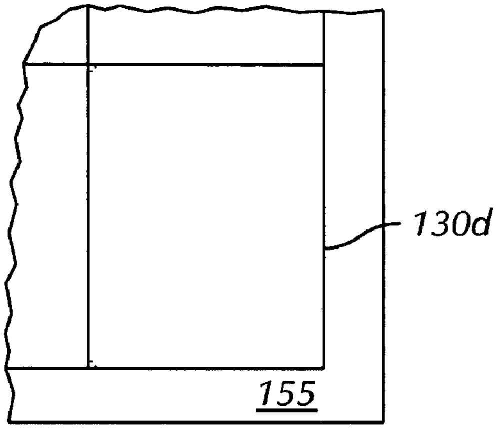

One of the sides, e.g., the left side as shown and including the relatively large exposed adhesive portion 138', may then be pressed down against the surface 155 and any adjoining face sub-sheets 130. The other side, e.g., the right side, may then be curled toward the adhered side as shown in FIG. 33F. Because of the relatively small exposed adhesive portions 138", the face sub-sheet 130*d* peels relatively easily away from the surface 155 and any adjacent adhered face sub-sheets, while the portion of the face sub-sheet 130*d* corresponding to the relatively large exposed adhesive portion 138' remains adhered. The remaining border, e.g., the right border 128*d* as shown, may then be peeled away from the face sub-sheet 130*d*. In embodiments with the perforated sections 190, the peeling of the right border 128*d* will also peel the backing sub-sheet 136 away as well because of the attachment provided by the perforated sections 190, as shown in FIG. 33G. The face sub-sheet 103*d* may then be adhered to the surface 155, as shown in FIG. 33H.

Figure 34:
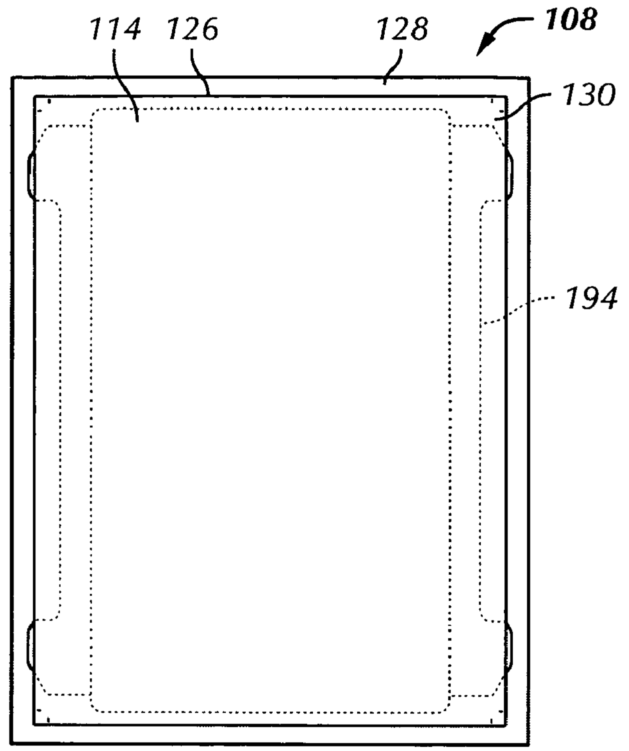
FIG. 34 is a plan view of a front side of a sheet of printing stock according to still other embodiments.
Figure 36:
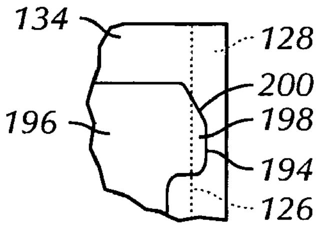
FIG. 36 is an enlarged fragmentary view of a tab section of a backing sub-sheet of the sheet of printing stock of FIGS. 34 and 35.
Figure 35:
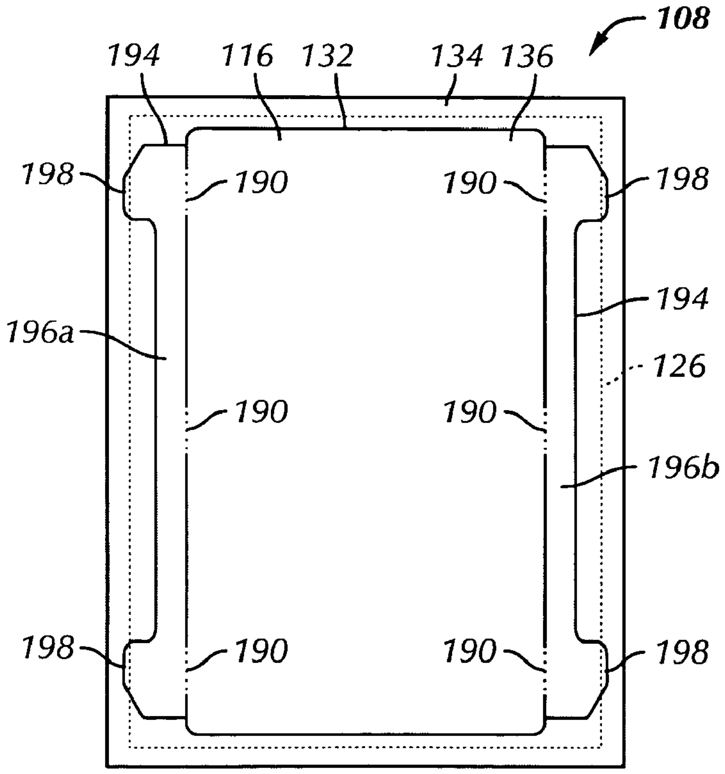
FIG. 35 is a plan view of a back side of the sheet of printing stock of FIG. 34.

Further embodiments of a sheet 108 of printing stock are illustrated in FIGS. 34 and 35. In these embodiments, a face sheet 114 may have a face cut 126 defining a margin 128 and a face sub-sheet 130. A backing sheet 116 may have a primary backing cut 132 defining a border 134 and a backing sub-sheet 136. In addition, the backing sheet 116 may include one or more secondary backing cuts 194 extending from the primary backing cut 132 into the border 134, thereby forming one or more border sections 196, for example a left border section 196*a* and a right border section 196*b*. The secondary backing cuts 194 may also define one or more tab sections 198 of the border sections 196 at locations at which the secondary backing cuts 194 extend spatially beyond the face cut 126 and are juxtaposed over the margin 128 of the face sheet 114, as particularly shown in FIG. 36. In some of the embodiments, the secondary backing cuts 194 may include an angled section 200 spatially positioned over the face cut 126 for facilitating a non-tearing separation of the tab sections 198 from the adhesive surface 120 of the face sheet 114, which is discussed in more detail below.

Figure 37A:
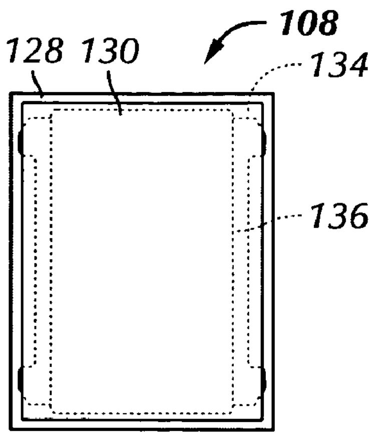
FIGS. 37A to 37H illustrate methodology for applying a face sub-sheet of the sheet of printing stock shown in FIGS. 34 and 35 to a surface according to some of the embodiments.
Figure 37B:
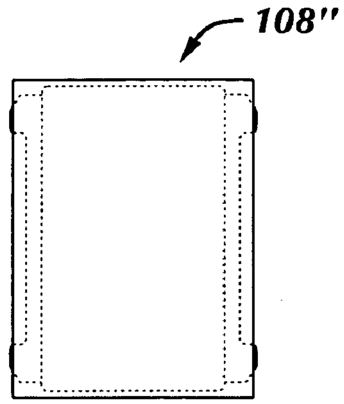
Figure 37C:
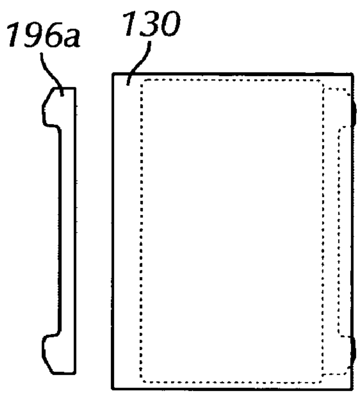
Figure 37D:
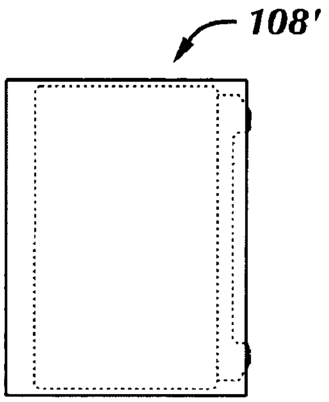
Figure 37D:
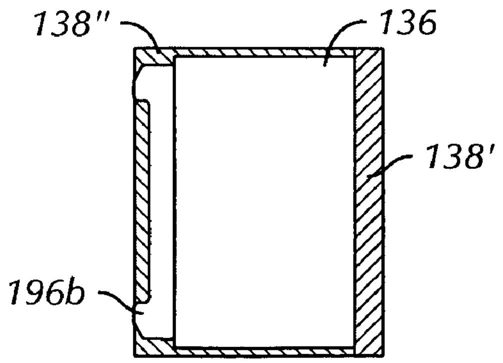

With continued reference to FIGS. 34 and 35 and additional reference to FIGS. 37A to 37H, after the sheet 108 has been printed upon with a sub-image 112 (not shown in FIG. 37A; see, e.g., FIG. 3), the margin 128 and the board 128 may be may be separated from the face sub-sheet 130 and the backing sub-sheet 136, thereby yielding a modified sheet 108", as shown in FIG. 37B. Either one of the border sections 196, e.g., the left border section 196*a* as shown in FIG. 37C, may be removed by peeling the border section away from the face sub-sheet 130 and breaking the perforated sections 190 if present, thereby yielding a readily adherent sheet 108' as shown in FIG. 37D.

Figure 37E:
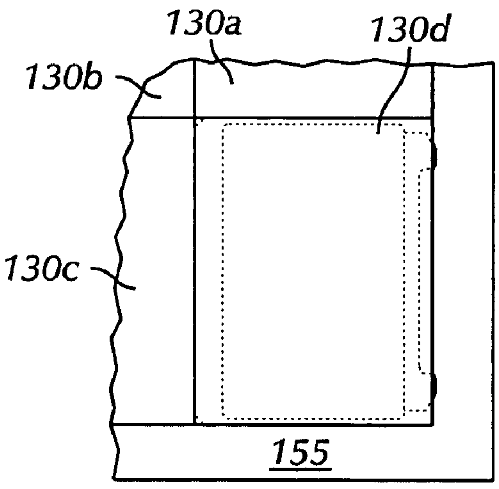
Figure 37F:
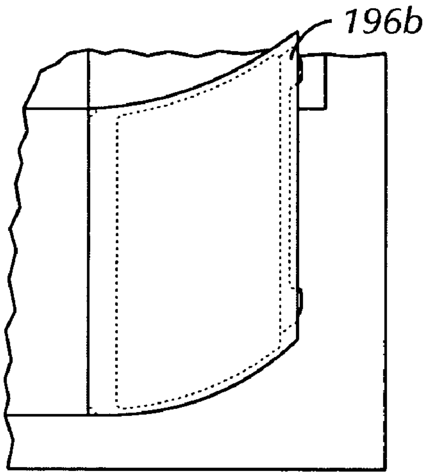

As shown in FIG. 37E, the readily adherent sheet 108' may then be adhered to a surface 155. If other face sub-sheets 130 have already been adhered to the surface 155 (e.g., face sub-sheets 130*a*, 130*b*, and 130*c* as shown in FIG. 37E), then the readily adherent sheet 108' may be aligned therewith as described above. One of the sides, e.g., the left side as shown, may then be pressed down against the surface 155 and any adjoining face sub-sheets 130. The other side, e.g., the right side, may then be curled toward the adhered side as shown in FIG. 37F.

As shown in FIG. 37D', with the removal of the left border section 196*a*, the readily adherent sheet 108' includes a relatively large exposed adhesive portion 138' indicated by cross hatching. And with the removal of the margin 128 and the border 134, the readily adherent sheet 108' includes a relatively small exposed adhesive portion 138" indicated by contrasting cross hatching.

Figure 37G:
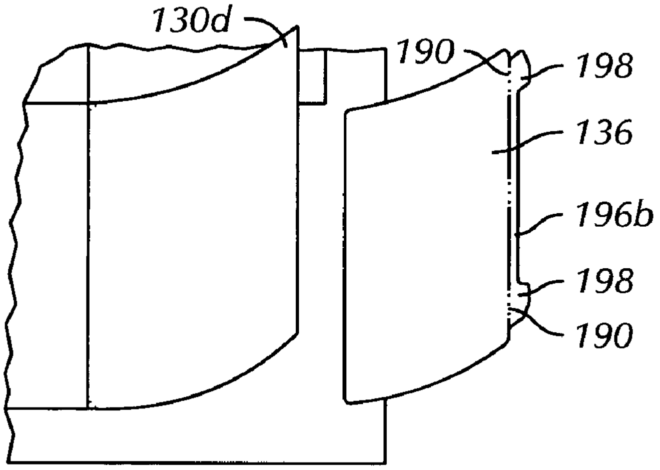
Figure 37H:
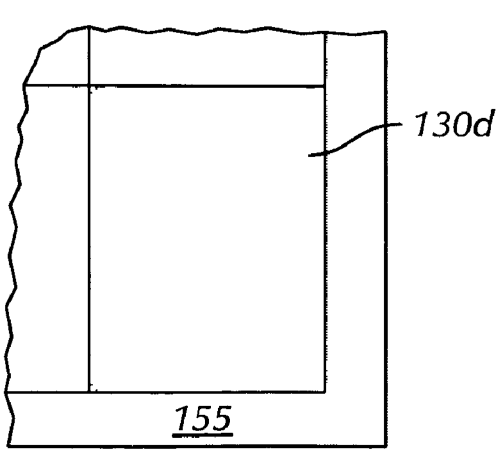
Figure 38:
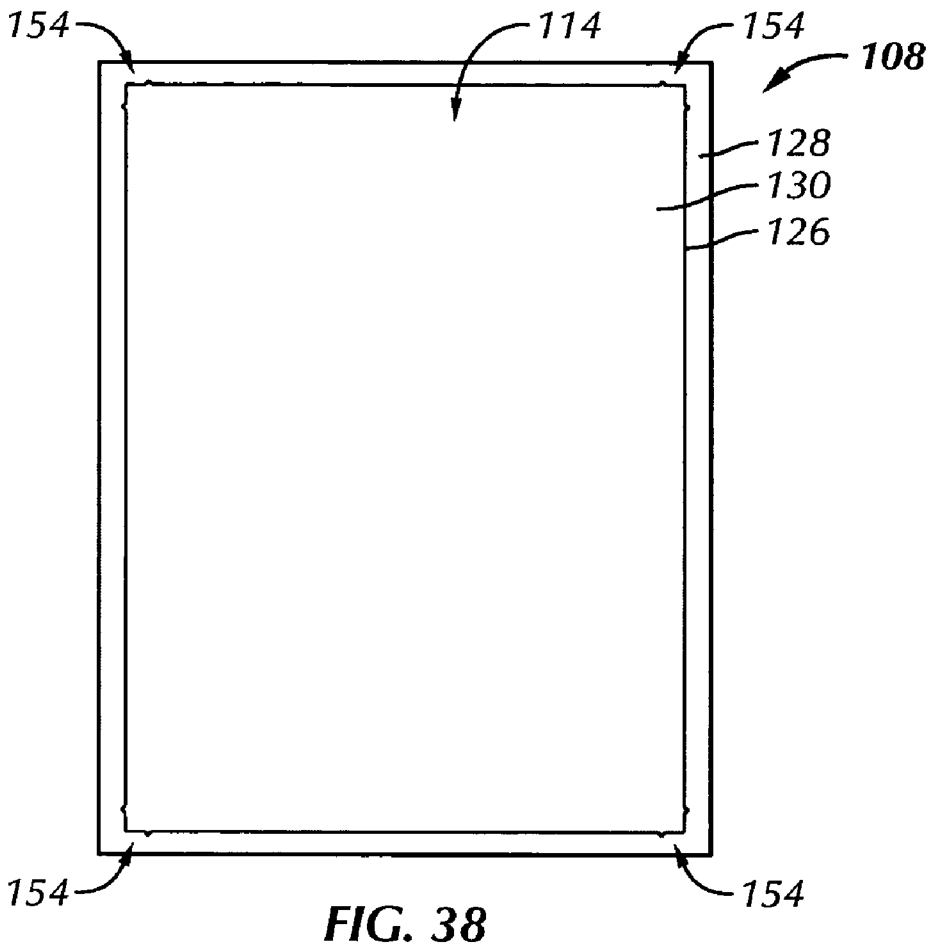
FIG. 38 is a plan view of a front side of a sheet of printing stock according to still further embodiments.
Figure 39:
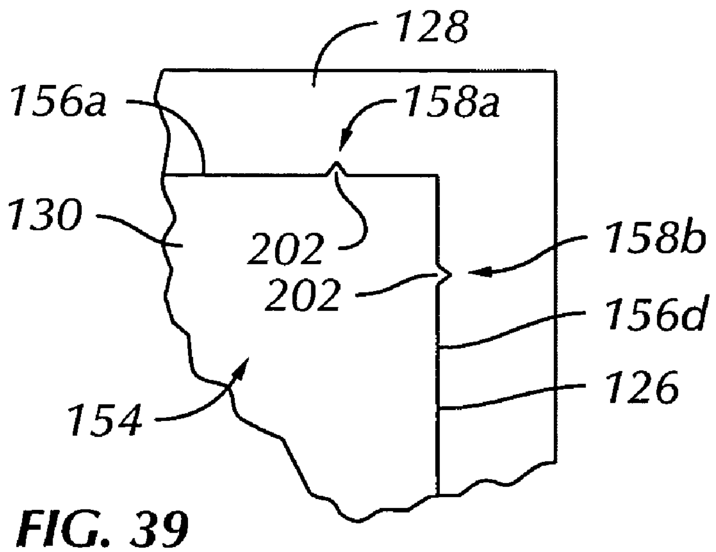
FIG. 39 is an enlarged fragmentary view of a corner of the sheet of printing stock of FIG. 38 showing registration marks.

The remaining border, e.g., the right border section 196*b* as shown, may then be peeled away from the face sub-sheet 130*d*. Because of the relatively small exposed adhesive portions 138", the face sub-sheet 130*d* peels relatively easily away from the surface 155 and any adjacent adhered face sub-sheets, while the portion of the face sub-sheet 130*d* corresponding to the relatively large exposed adhesive portion 138' remains adhered. The tab sections 198 provide a purchase on which to grasp to facilitate the peeling. The angled section 200 at the tab section 194 facilitates a smooth peeling action at that location. In embodiments with the perforated sections 190, the peeling of the right border section 196*b* will also peel the backing sub-sheet 136 away as well because of the attachment provided by the perforated sections 190, as shown in FIG. 37G. The face sub-sheet 103*d* may then be adhered to the surface 155, as shown in FIG. 37H.

Figure 40:
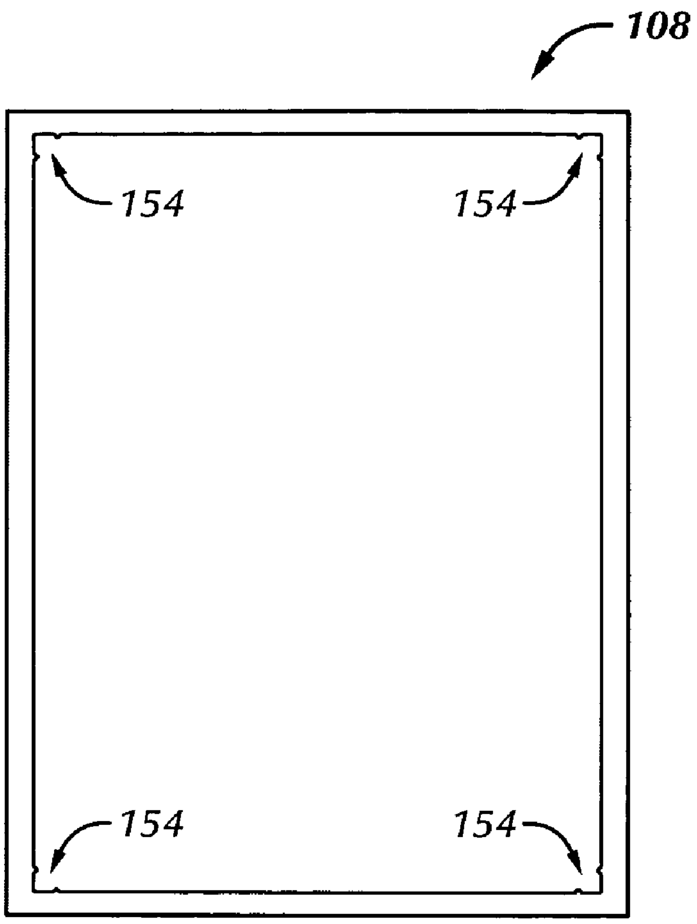
FIG. 40 is a plan view of a front side of a sheet of printing stock according to other embodiments.
Figure 41:
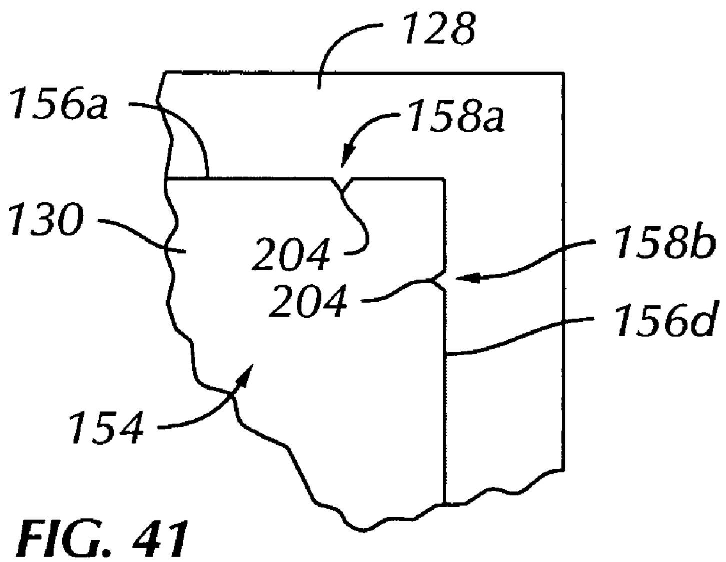
FIG. 41 is an enlarged fragmentary view of a corner of the sheet of printing stock of FIG. 40 showing registration marks.

Reference is now made to FIGS. 38 to 43 which respectively illustrate examples of additional embodiments of printing stock 108, particularly embodiments of printing stock 108 with different examples of registration marks 154. More specifically, in the embodiments shown in FIGS. 38 and 39, the registration marks 154 may include one or more alignment elements 158 that are formed in the face sheet 114 as tabs 202 that protrude outwardly from the edges 156 of the face sub-sheet 130. In other words, the alignment elements 158 may be described as discontinuities in the face cut 126 located at predetermined positions, such as less than an inch or so from a corner of the face sub-sheet 130 (e.g., about three eighths of an inch). Accordingly, the alignment elements 158 may be made at the same time or during the same production step as the face cut 126. In alternative embodiments as represented in FIGS. 40 and 41, the alignment marks 158 may be formed in the face sheet 114 as notches 204 that protrude inwardly into the face sub-sheet 130 from the edges 156 thereof.

Figure 42:
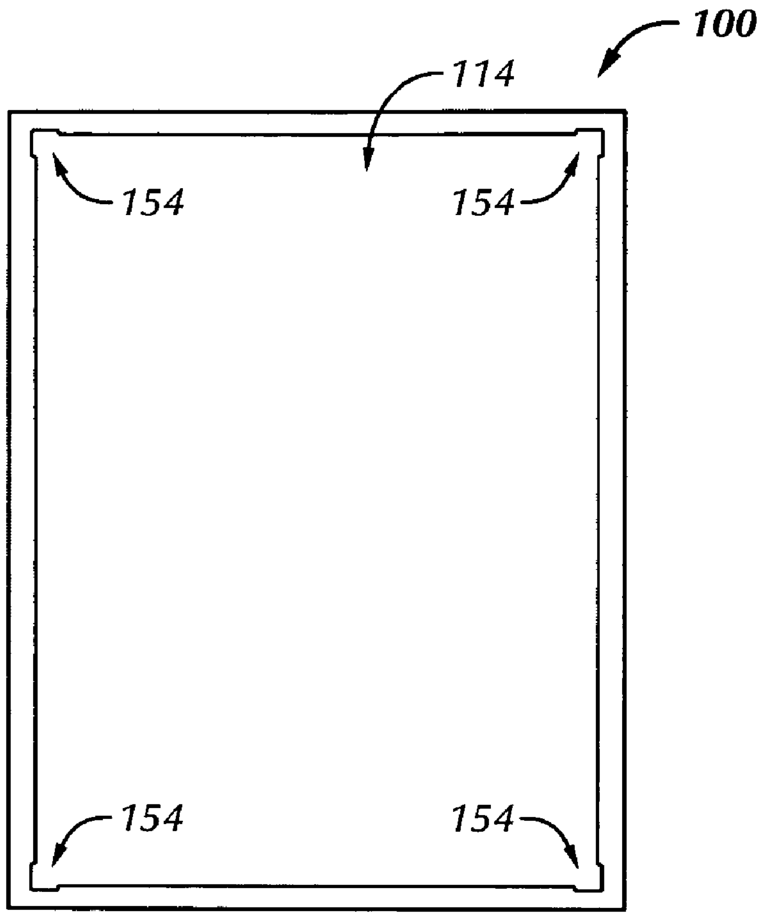
FIG. 42 is a plan view of a front side of a sheet of printing stock according to still more embodiments.
Figure 43:
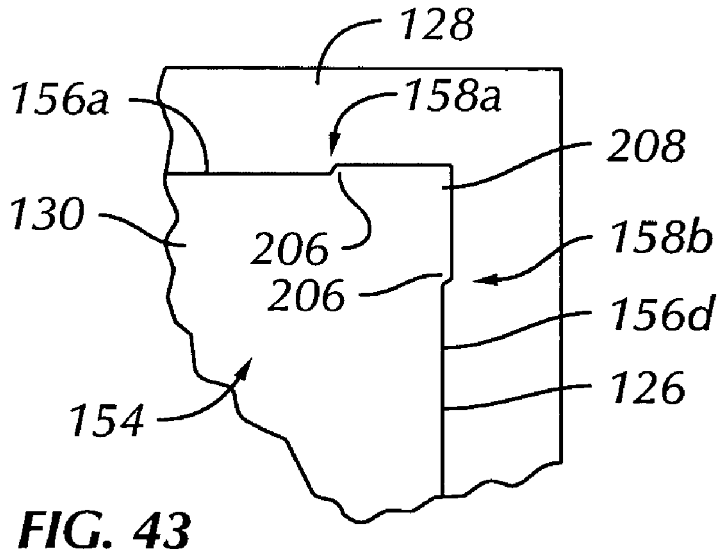
FIG. 43 is an enlarged fragmentary view of a corner of the sheet of printing stock of FIG. 42 showing registration marks.

Other examples of the registration marks 154 are represented by the embodiments of FIGS. 42 and 43. In these embodiments, the alignment elements 158 may be formed in the face sheet 114 as angled cuts 206 that either project inwardly from the edges 156 of the face sub-sheet 130 or outwardly as shown. Accordingly, the angled cuts 206 define discontinuities in the face cut 126 and define an enlarged corner 208 of the face sub-sheet 130. Like the embodiments described above, as the angled cuts 206 define a section of the face cut 126, the registration marks 154 of these embodiments may be made during production at the time the face sheet 114 is cut into the face sub-sheet 130 and margin 128. Regardless of the embodiment, the registration marks 154 enable a face sub-sheet 130 that is to be subsequently positioned to be overlapped on top of an already positioned face sub-sheet 130, and then to be moved to make adjustments as needed to more properly align the image 112 to compensate for misregistration or skewing.

Figure 44:
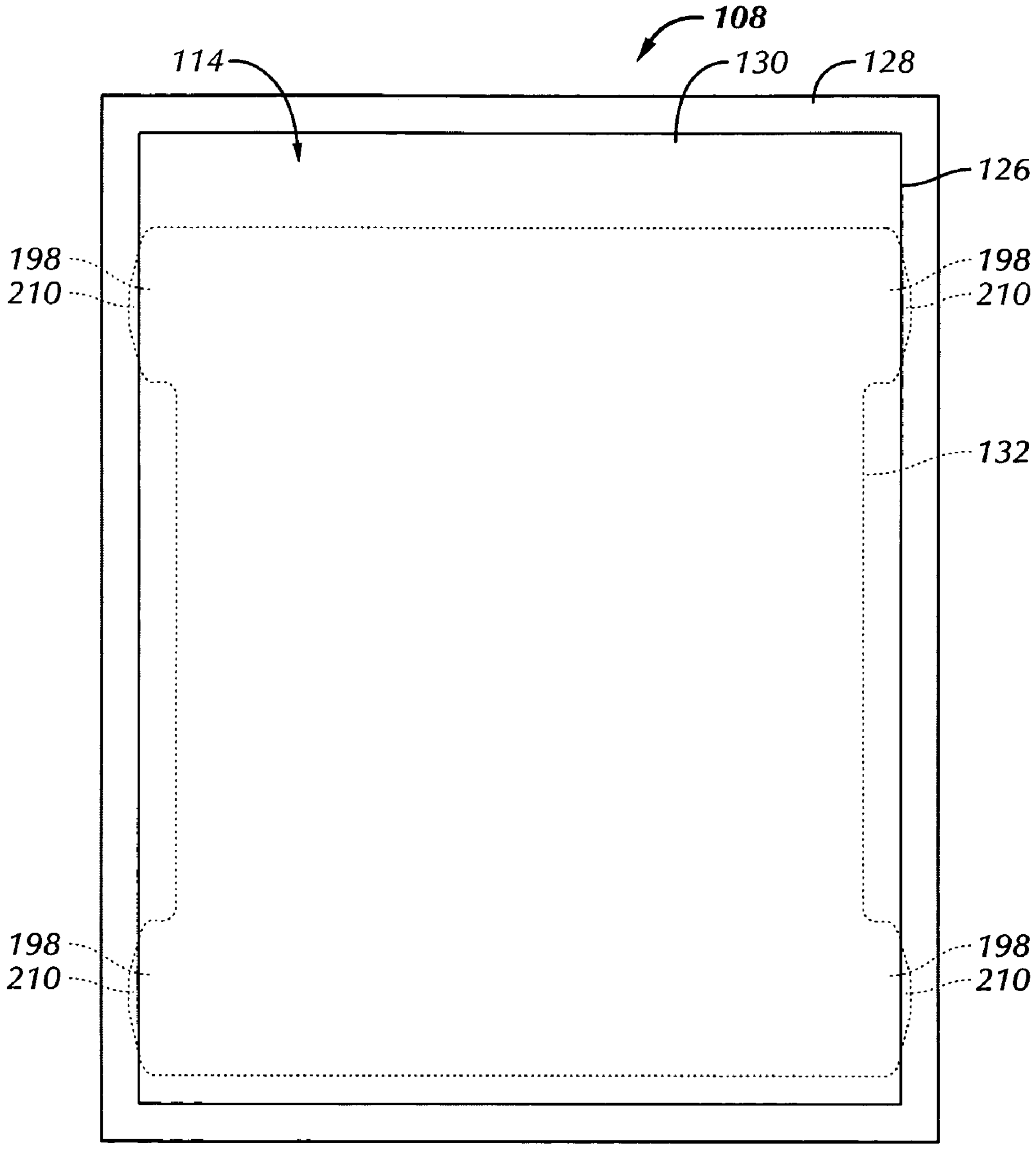
FIG. 44 is a plan view of a front side of a sheet of printing stock according to a number of embodiments.
Figure 45:
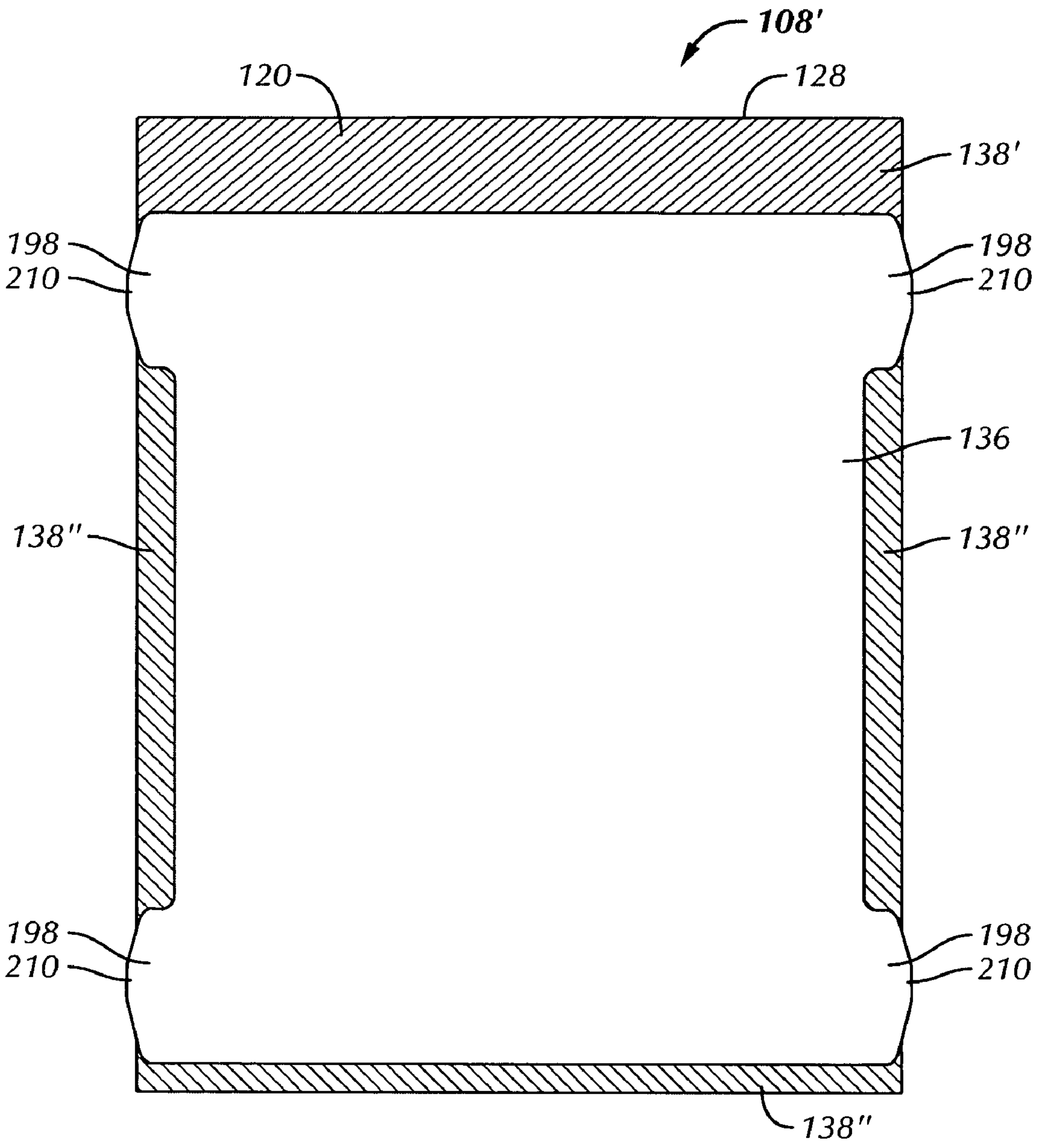
FIG. 45 is a plan view of a back side of a readily adherent sheet of printing stock illustrating exposed adhesive portions.

Reference is now made to FIGS. 44 and 45 in which are illustrated further embodiments of a sheet 108 of printing stock. In these embodiments, a face sheet 114 may have a face cut 126 defining a margin 128 and a face sub-sheet 130. A backing sheet 116 may have a backing cut 132 defining a border 134 and a backing sub-sheet 136. As shown, one or more sections of the backing cut 132 may extend outwardly to form one or more tab sections 198. Each tab section 198 may extend spatially beyond the face cut 126 to define an overlay 210 that is juxtaposed over the margin 128 of the face sheet 114, as highlighted by the cross hatching in FIG. 44.

In a number of embodiments, the backing cut 132 may be set apart spatially a relatively greater distance from one of the sides of the face cut 126 (in the example shown, a top side of the face cut 126). Accordingly, with the removal of the face sub-sheet 130 along with the backing sub-sheet 136 (i.e., the readily adherent sheet 108') as shown in FIG. 45, a relatively large exposed adhesive portion 138' may be defined along one of the sides or edges of the readily adherent sheet 108', while relatively small exposed adhesive portions 138" may be defined along the other sides or edges.

Figure 46:
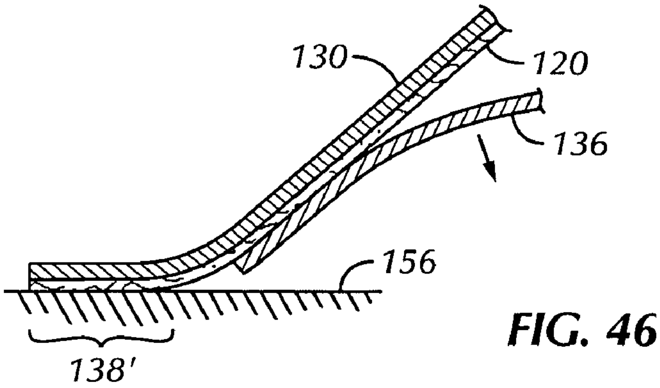
FIG. 46 is a fragmentary cross-sectional view of the readily adherent sheet of FIG. 45.

With reference to FIG. 46, when positioned in a desired location on a surface 156 (see also, e.g., FIGS. 33E and 33F), the relatively large exposed adhesive portion 138' may be pressed down against the surface 156 to retain the readily adherent sheet 108' in place. The remainder of the sheet 108' may then be lifted up to remove the backing sub-sheet 136, with the face sub-sheet 130 thereafter being pressed and adhered to the surface 156.

Figure 47:
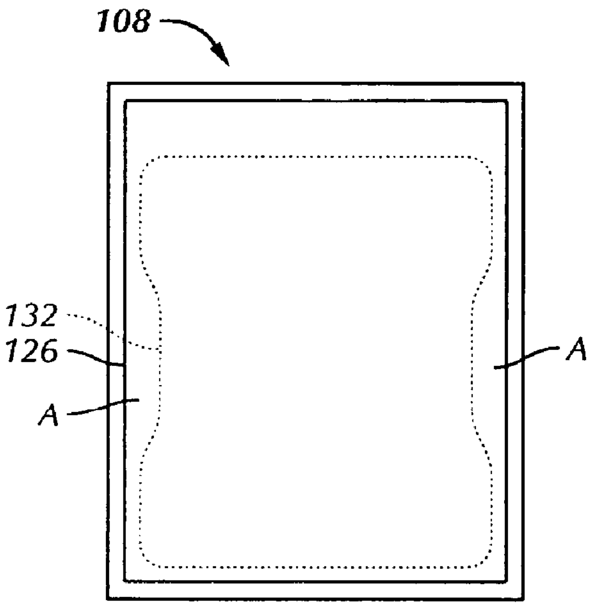
FIG. 47 is a plan view of a front side of a sheet of printing stock according to further embodiments.
Figure 48:
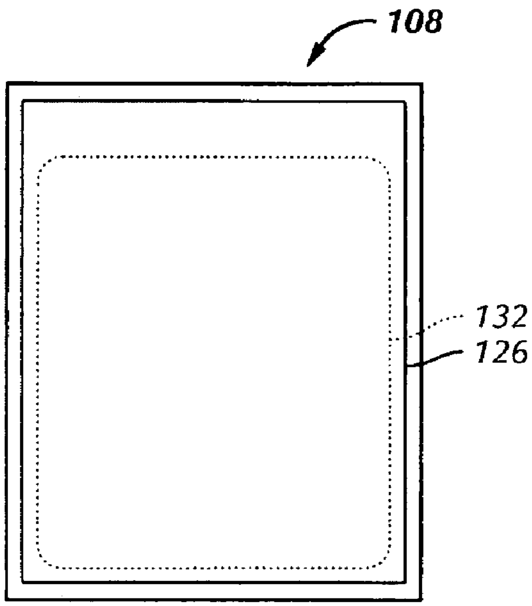
FIG. 48 is a plan view of a front side of a sheet of printing stock according to still further embodiments.
Figure 49:
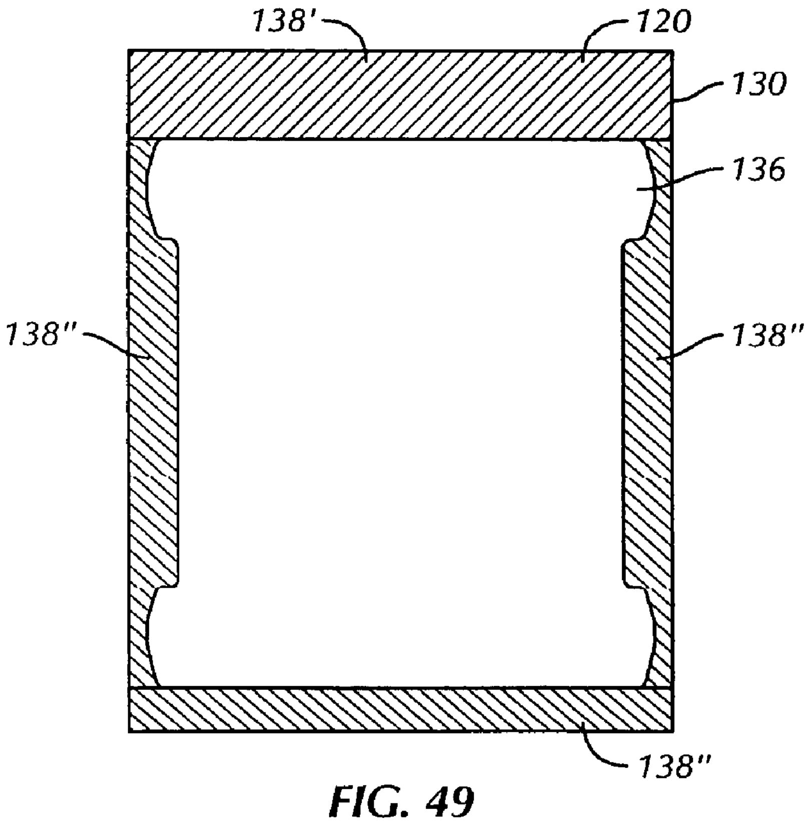
FIG. 49 is a plan view of a back side of a readily adherent sheet removed from the sheet of print stock of FIG. 48.

Alternatively embodiments of sheets 108 of printing stock are illustrated in FIGS. 47 and 48. Similar to the embodiment shown in FIG. 44, the backing cut 132 may set apart spatially a relatively greater distance from one of the sides of the face cut 126. In contrast to the prior embodiments, the backing cut 132 may be spatially contained within the face cut 126, i.e., there are not overlays 210 (see FIGS. 44 and 45). The backing cut 132 may include indentations to provide an increased width of the border 134 indicated at A as shown in FIG. 47 or, alternatively, may be substantially rectangular or rectilinear in shape as shown in FIG. 48. In either embodiment, when the readily adherent sheet 108' is removed as shown in FIG. 49, a relatively large exposed adhesive portion 138' may be defined along one of the sides or edges of the readily adherent sheet 108' (represented by cross hatching), while relatively small exposed adhesive portions 138" may be defined along the other sides or edges (represented by opposing cross hatching).

In addition to the embodiments illustrated in the drawings, the system includes any number of additional embodiments, modifications, and alternatives of the sheets 108 of printing stock. For example, in some of the embodiments, the sheets 108 may utilize discontinuous die cuts or perforations to define weakening lines on the four sides of the face sub-sheet 130 and backing sub-sheet 136. In addition, the adhesive layer 122 may be continuous or, alternatively, discontinuous. Further, the backing sheet 116 may be coextensive with the face sheet 114, may cover only the area(s) of the face sheet 114 with an adhesive surface 120, or may cover both areas with adhesive 122 and areas of the face sheet 114 without adhesive.

Still further, the face cut 126 may include discontinuous die cuts or perforations to define a single face sub-sheet 130 therewithin as shown in, e.g., FIGS. 3 and 4, or may include cuts that extend all the way to or close to the edges of the face sheet 114. The face cut(s) 126 may extend through the face sheet 114 and the adhesive layer 122 only, or may extend through the face sheet 114, the adhesive layer 122, and the backing sheet 116.

The removal of the border sections of the backing sheet 116 may take place before or after removal of the face sub-sheet 130 from the backing sheet 116. Alternately, the face sub-sheets 130 may be independent and free of pressure-sensitive adhesive or a liner, with adhesive to attach the face sub-sheets to a surface or a carrier already applied on the surface of the carrier in the form of tape, pressure-sensitive adhesive with a liner, or water-based adhesive.

In addition, adhesive may be supplied independently in the form of tape, paste, spray, or liquid. Tape or adhesive may also be applied to the face sub-sheets directly, either on a back surface or on a front surface, so that a secondary surface is not required for assembly of a sign. Alternately, the face sheet 114 may have adhesive on the back side thereof that is not pressure sensitive but rather and water based, so that application of water to the adhesive activates the adhesive to enable bonding to a surface. Still alternately, double-sided tape may be applied to a back side of the face sheet 114, either by the manufacturer or by the user, with a layer of backing sheet attached to the exposed side of the tape.

In still other embodiments, double-sided tape may be in strips or may cover some or all of a back side of the face sub-sheet 130 in continuous or discontinuous patterns. Alternatively, adhesive may be provided both on a back side of the face sub-sheet 130 and on the surface 155 of a carrier such that the adhesive may be cohesive; namely, adhesives that do not bond to most other surfaces but do bond to a similar adhesive using pressure to bond the layers. Still alternatively, cohesive adhesives may be differently formulated but may form a unique bond when put in contact with one another under pressure.

Further embodiments of the sheet 108 may utilize a top layer of material which has a brittle layer bonded to a back side of the top layer. A face cut or a weakening line made through the top layer, either continuous or discontinuous, may define a perimeter of the face sub-sheet 130. Bending the sheet at the weakening line may then fracture the brittle layer at the weakening line, creating a separation. The sheet 108 may be releasably bonded to a backing sheet with adhesive.

In still further embodiments, the sheet 108 may utilize a double-sided laminated assembly, that is: a first sheet of face material, an adhesive layer, a release agent, a liner sheet, a release agent on the other side of the liner sheet, another adhesive layer, and a second sheet of face material. The adhesive layer may be continuous or discontinuous, as described above. Alternately, the liner sheet may be eliminated, with each opposing sheet of face material having an alternating pattern of adhesive and release agent. The sheets of face material may be assembled so that the adhesive is in contact with the release agent on the opposing sheet, so that the sheets may be easily separated from one another without the use of a release liner and applied to a secondary surface. In either embodiment, the face cuts may be formed on both sides of the assembly as described above, or the face cuts may be discontinuous and through the entire assembly. The sheets of face material may be identical in substance and color or differently configured.

In still other embodiments, a sheet 108 of printing stock may utilize a fan-folded or rolled continuous web of printable material (which is known in the art as banner material), with or without perforations between adjoining sheets to allow the web to be separated when so desired. The web of printable material may be a single layer or a laminate with a face material, an adhesive, and a release agent on a liner. In this way, larger images may have the sheets 108 in a single row or column to be printed in a continuous stream, thereby eliminating the need for alignment of the sheets in one of the two directions in the larger image assembly. The fan-folded or rolled continuous web could have weakening lines or face cuts that are continuous or discontinuous along the length of the web on the right and left sides of the web, so that the unprinted area can be easily removed in preparation for assembly. The web may be a multilayer construction utilizing any of the variations described above, or the web may be a single-layer construction applied to a secondary surface as described above. The adhesive may also be applied separately as a double-back tape or as a liquid, or may be on the carrier or liner sheet.

According to further embodiments, a sheet 108 of printing material may include a rectangular piece of printable face material with a removable adhesive bonded to a back side of the face material. The face material may be adhered to a second, larger rectangular piece of material in such a way as to have the adhesive preferentially adhere to the face material when the two layers are separated. Such an arrangement may be accomplished either by having an additional coating between the adhesive and the face that forms a stronger bond, by applying a release agent on the second layer of material, by the method of application, or by the inherent properties of the two materials themselves, such as differing surface tensions. The smaller rectangular top sheet may be positioned on top of the larger rectangular sheet in such a way as to provide a printable surface that may be printed upon past the edges of the sheet, which may be desirable for large sign assemblies. The second layer of material may be configured to absorb most or all of the ink that is applied beyond the edges of the face material, thereby allowing the ink to dry (ink-jet ink normally beads up and form pools of liquid ink if applied to the release side of a typical release liner). The assembly of the sheets may be accomplished either by cutting one or both of the two sheets to size before assembly. Alternatively, the assembly may be accomplished by placing weakening lines or cuts in a rectangular shape in the face layer of a continuous web, removing the face material around the rectangle of face material, and then cutting the web into similar sheets. To utilize this embodiment, the smaller rectangular sheet of face material may be removed from the second layer of material after printing and applied to a secondary surface. The adhesive may be continuous or discontinuous, as described above.

In further embodiments, a sheet 108 of printing stock may be configured to work with ink jet printers that have the capability to print to the edge of the sheet. In embodiments in which a printer is able to print to three of the four edges of the sheet, thereby leaving one edge with a margin, the sheet may include a weakening line or face cut on one edge only. The construction may be a laminate or a single layer, with or without adhesive, and the weakening line may be continuous or discontinuous, with any of the variations described above. In embodiments in which a printer is able to print all the way to all four edges of the sheet, a laminate sheet with face material, adhesive, and release-coated liner with no weakening lines may be utilized. The adhesive may be incorporated as described above. Alternately, the sheet may have no adhesive, with the adhesive being supplied independently or applied to a carrier sheet.

Yet other embodiments may incorporate one or more methods of attaching the sheets to a secondary surface or a carrier without the use of adhesive on the sheet or on the carrier. In these embodiments, a third element may be utilized that has adhesive covering some or all of a back side, and a clear face side. This third element may form a sleeve that is large enough for inserting the entire sheet into the sleeve. Alternatively, the third element may be smaller than the sheet and may capture one corner of the sheet only, in which embodiment four of these elements may be used per sheet. The third element may also capture the corners of more than one sheet, so that one corner of one to four of the sheets may be captured by each corner element. In other embodiments, the third element may include slots or grooves for capturing a respective edge of the sheet. Two to four of these elements may be used per sheet. These elements may be supplied either already attached to a carrier or separately. The elements may be designed to allow the sheets either to have butted edges or to overlap. The elements may allow for movement of the sheet within the element or may grasp the sheet by pressure between two opposing surfaces.

According to further embodiments, a sheet 108 of printing stock may utilize static-cling sheets to bond to a secondary surface. Alternatively, the sheet 108 may utilize magnetic sheets to bond to a secondary surface. In either embodiment, the sheets may have continuous weakening lines or discontinuous weakening lines, or may be free of weakening lines.

In other embodiments, a sheet 108 of printing stock may include a single sheet that is approximately four times the size of a standard printable sheet, which has been folded once on center in one direction, and then once on center 90 degrees from the first fold, creating a folded sheet that is one-fourth the size of the original sheet. The sheet of this embodiment may be printed in folded form, first one side, then the other. Then the second fold may be reversed, and the other two quadrants may be printed, first one side, then the other. Finally, the sheet may be unfolded. The resulting total image is printed on one sheet, with no adhesive or secondary surface required.

Those skilled in the art will understand that the preceding embodiments of the system provide the foundation for numerous alternatives and modifications thereto. For example, the printing stock may be used to print signs that fit on a single sheet 108 of printing stock. In addition, the layer 122 of adhesive may be applied in a pattern on the back side 124 of the face sheet 114 so that the adhesive surface 120 is adherent substantially only at the portion thereof that is adjacent to the border 134 of the backing sheet 116. Further, rather than cutting into or through the face sheet 114, the registration marks 154 may be applied to the printing surface 118 by the computer 104 during the printing of the sub-images 112 thereon. These other modifications are also within the scope of the present invention. Accordingly, the present invention is not limited to that precisely as shown and described herein.

What is claimed is:

1. A system for printing a sign, the system comprising:

a plurality of sheets of printing stock each including:

a face sheet including:

a printing surface;

an adhesive surface; and a face cut forming a margin and a face sub-sheet such that at least a portion of the margin is separable from the face sub-sheet; and a backing sheet including a backing cut forming a border and a backing sub-sheet such that at least a portion of the border is separable from the backing sub-sheet so that at least a portion of the adhesive surface of the face sheet is exposable;

a computer configured to process a digital image into a plurality of sub-images in which at least portions of two or more adjacent sub-images overlap such that when the plurality of sub-images are printed on a respective plurality of sheets of printing stock and when the face sub-sheets from the respective plurality of sheets of printing stock are arranged in a predetermined pattern, the sign is formed and includes a composite printed image with no breaks in the composite printed image, corresponding to the digital image; and a printer in communication with the computer and configured to print the plurality of sub-images on a respective plurality of sheets of printing stock.

2. The system of claim 1 further comprising a carrier including a surface for receiving the face sub-sheets from the respective plurality of sheets of printing stock.

3. The system of claim 1 wherein the face sheet has a size selected from a group consisting of A4, 8½×11 inches, and legal size.

4. The system of claim 1 wherein the printer is a small-office, home-office (SOHO) printer.

5. The system of claim 1 further comprising a software application loaded on the computer for processing the image.

* * * * *